US 10,814,552 B2

(12) United States Patent
Prakash et al.

(10) Patent No.: US 10,814,552 B2
(45) Date of Patent: Oct. 27, 2020

(54) POWDER DISPENSING UNIT, POWDER SPREADING UNIT, AND A VIBRATORY COMPACTION SYSTEM OF AN ADDITIVE MANUFACTURING SYSTEM AND METHODS THEREFOR

(71) Applicant: The Boeing Company, Chicago, IL (US)

(72) Inventors: Om Prakash, Bangalore (IN); Araveti Gupta, Bangalore (IN)

(73) Assignee: The Boeing Company, Chicago, IL (US)

( * ) Notice: Subject to any disclaimer, the term of this patent is extended or adjusted under 35 U.S.C. 154(b) by 133 days.

(21) Appl. No.: 16/146,352

(22) Filed: Sep. 28, 2018

(65) Prior Publication Data

US 2020/0101664 A1    Apr. 2, 2020

(51) Int. Cl.

| | |
|---|---|
| *B29C 64/214* | (2017.01) |
| *B29C 64/336* | (2017.01) |
| *B29C 64/245* | (2017.01) |
| *B29C 64/255* | (2017.01) |
| *B29C 64/307* | (2017.01) |
| *B33Y 10/00* | (2015.01) |
| *B33Y 30/00* | (2015.01) |
| *B33Y 40/00* | (2020.01) |
| *B29C 64/153* | (2017.01) |

(Continued)

(52) U.S. Cl.
CPC .......... *B29C 64/214* (2017.08); *B29C 64/153* (2017.08); *B29C 64/245* (2017.08); *B29C 64/255* (2017.08); *B29C 64/307* (2017.08); *B29C 64/336* (2017.08); *B29C 64/165* (2017.08); *B29C 2791/008* (2013.01); *B33Y 10/00* (2014.12); *B33Y 30/00* (2014.12); *B33Y 40/00* (2014.12); *B33Y 70/00* (2014.12)

(58) Field of Classification Search
None
See application file for complete search history.

(56) References Cited

U.S. PATENT DOCUMENTS

| | | | |
|---|---|---|---|
| 7,367,076 B2 | 5/2008 | Makarov et al. | |
| 8,568,124 B2 | 10/2013 | Brunermer | |
| 9,604,411 B2* | 3/2017 | Rogren | B33Y 10/00 |

(Continued)

FOREIGN PATENT DOCUMENTS

GB    2548340    9/2017

OTHER PUBLICATIONS

P. Bidare, R.R.J. Maier, R.J. Bech, J.D. Shepard, and A.J. Moore, "An Open-Architecture Metal Powder Bed Fusion System for In-Situ Process Measurements", Additive Manufacturing 16 (2017) 177-185, UK.

(Continued)

*Primary Examiner* — Mary Lynn F Theisen
(74) *Attorney, Agent, or Firm* — Perman & Green LLP

(57) ABSTRACT

An additive manufacturing system including a build plate, at least one recoater blade configured to spread powder onto the build plate, and at least one vibration mechanism coupled to one or more of the build plate and the at least one recoater blade. A controller coupled to the at least one vibration mechanism is configured to control actuation of the at least one vibration mechanism so that vibratory pulses are induced within the powder to effect compaction of the powder on the build plate.

20 Claims, 24 Drawing Sheets

(51) Int. Cl.
*B29C 64/165* (2017.01)
*B33Y 70/00* (2020.01)

(56) References Cited

U.S. PATENT DOCUMENTS

| | | | |
|---|---|---|---|
| 10,093,065 B2* | 10/2018 | Ederer | B29C 64/165 |
| 2006/0105102 A1 | 5/2006 | Hochsmann et al. | |
| 2015/0273622 A1* | 10/2015 | Manabe | B23K 15/0086 |
| | | | 219/76.1 |
| 2015/0367415 A1* | 12/2015 | Buller | B23K 26/123 |
| | | | 419/53 |
| 2017/0189963 A1 | 7/2017 | Buller et al. | |
| 2017/0225403 A1* | 8/2017 | Welch | B33Y 40/00 |
| 2017/0326690 A1* | 11/2017 | Heard | C22C 1/05 |
| 2018/0009164 A1* | 1/2018 | Honda | B33Y 10/00 |
| 2018/0134027 A1* | 5/2018 | O'Neill | F16K 3/03 |
| 2018/0194074 A1 | 7/2018 | Shi et al. | |
| 2018/0236549 A1 | 8/2018 | Spears et al. | |
| 2018/0304358 A1* | 10/2018 | Myerberg | B22F 3/008 |
| 2018/0339452 A1* | 11/2018 | Heymel | B33Y 10/00 |
| 2019/0210281 A1* | 7/2019 | Adcock | B29C 64/205 |
| 2019/0366433 A1* | 12/2019 | Aydin | B29C 64/153 |

OTHER PUBLICATIONS

Liu, Bochuan, Ricky Wildman, Christopher Tuck, Ian Ashcroft, Richard Hague; "Investigation the Effect of Particle Size Distribution on Processing Parameters Optimisation in Selective Laser Melting Process", Additive Manufacturing Research Group, Loughborough Univerisity, (2011), http://sffsymposium.engr.utexas.edu/Manuscripts/2011/2011-18-Liu.pdf.

"Effect of Particles Size Distribution and Packing Density on the Formation of Balling Defects During SLM of In718", Inside Metal Additive Manufacturing, Nov. 27, 2015, http://www.insidemetaladditivemanufacturing.com/blog/effect-of-particles-size-distribution-and-packing-density-on-the-formation-of-balling-defects-during-slm-of-in718.

A. Budding, T.H.J Vaneker, New Strategies for Powder Compaction in Powder-Based Rapid Prototyping Techniques, Proceida CIRP 6 (2013) 527-532, Enschede, The Netherlands; https://www.sciencedirect.com/science/article/pii/S2212827113001741.

N.K. Roy and M.A. Cullinan, u-SLS of Metals: Design of the Powder Spreader, Powder Bed Actuators and Optics for the System; (2015), https://sffsymposium.engr.utexas.edu/sites/default/files/2015/2015-11-Roy.pdf.

Daniel Schiochet Nasato, Thorsten Poschel, Eric J. R. Parteli, "Effect of Vibrations Applied to the Transport Roller in the Quality of the Powder Bed During Additive Manufacturing", 6th International Conference on AdditiveTechnologies iCAT 2016, Nurnberg, Germany; http//www.mss.cbi.fau.de/content/uploads/Nasato-Poeschel-Parteli-2016.pdf.

Jonas Zielinski, Simon Vervoort, Hans-Wilfried Mindt and Mustafa Megahed, "Influence of Powder Bed Characteristics on Material Quality in Additive Manufacturing", BHM (2017) vol. 162 (5); 192-198, https://link.springer.com/article/10.1007/s00501-017-0592-9.

S. Haeri, Y. Wang, O. Ghita, J. Sun, "Discrete Element Simulation and Experimental Study of Powder Spreading Process in Additive Manufacturing", Powder Technology 306 (2016) 45-54, UK https://www.sciencedirect.com/science/article/pii/S0032591016307720.

European Search Report dated Nov. 28, 2019; Application No. EP19192868.8.

Yang et al, "Metering and Dispensing of Powder; The Quest for New Solid Freeforming Techniques", Powder Technology—Electrostatic Phenomena in Particulate Processes, Elsevier, Basel (CH), vol. 178, No. 1, Sep. 5, 2007, pp. 56-72.

\* cited by examiner

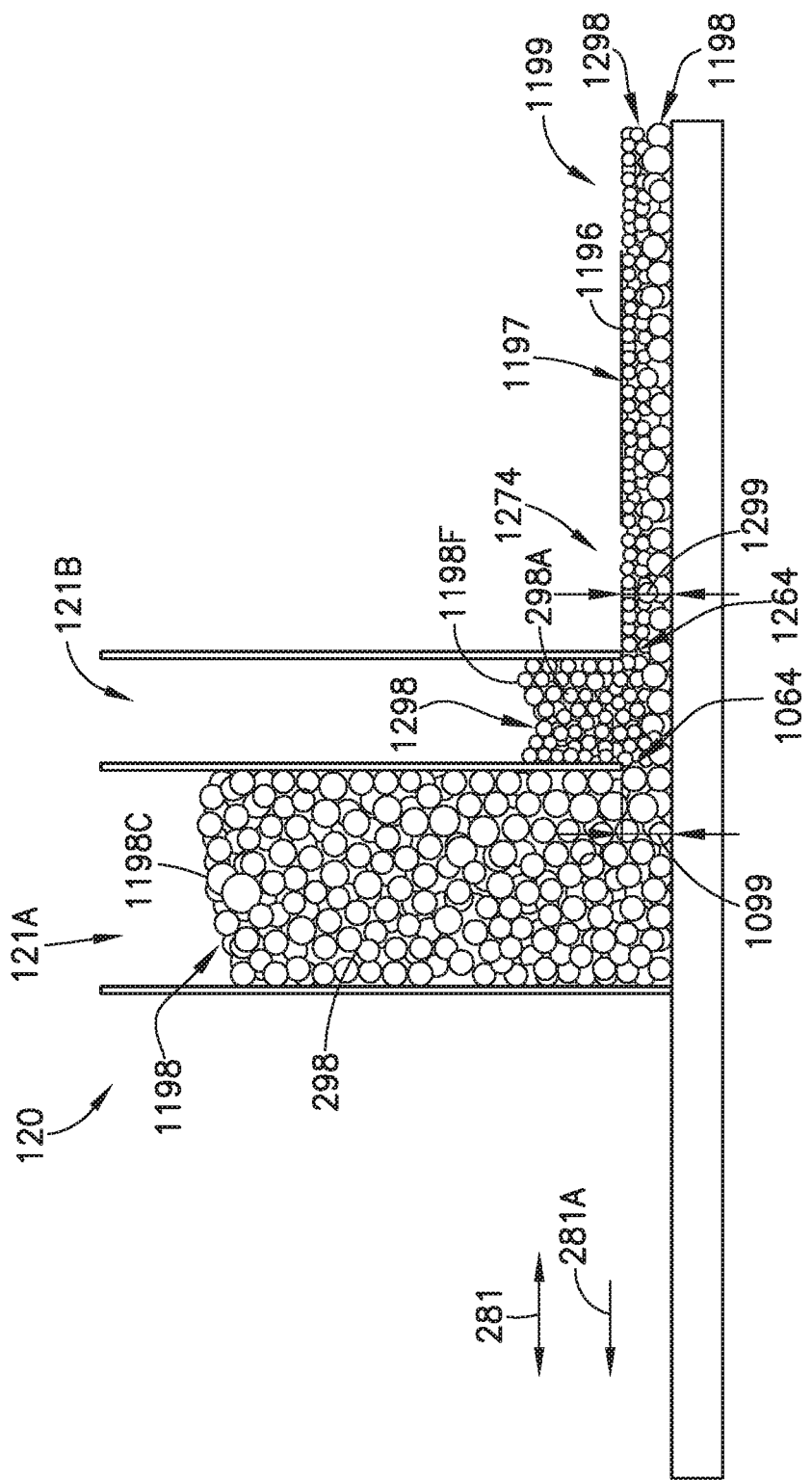

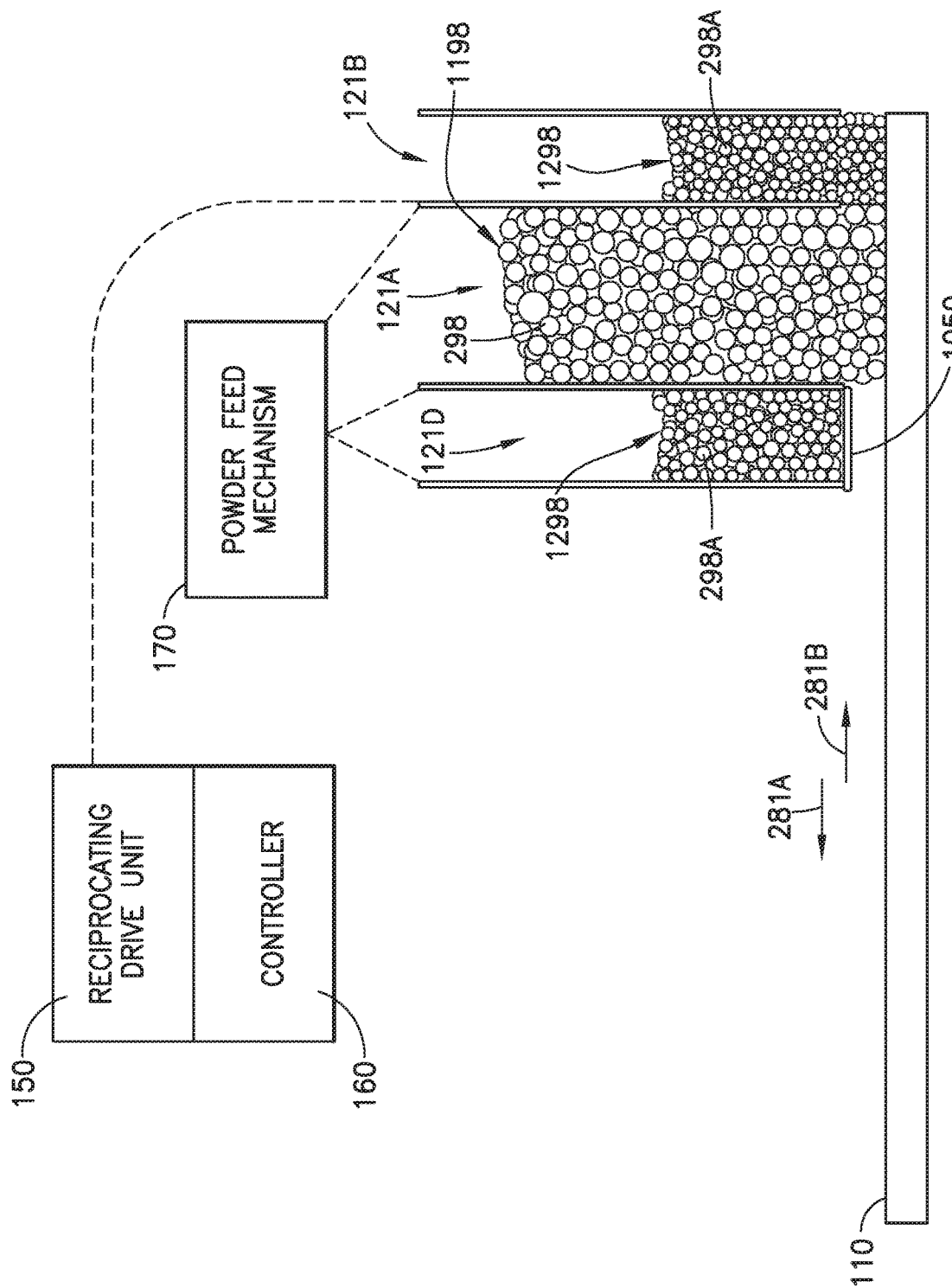

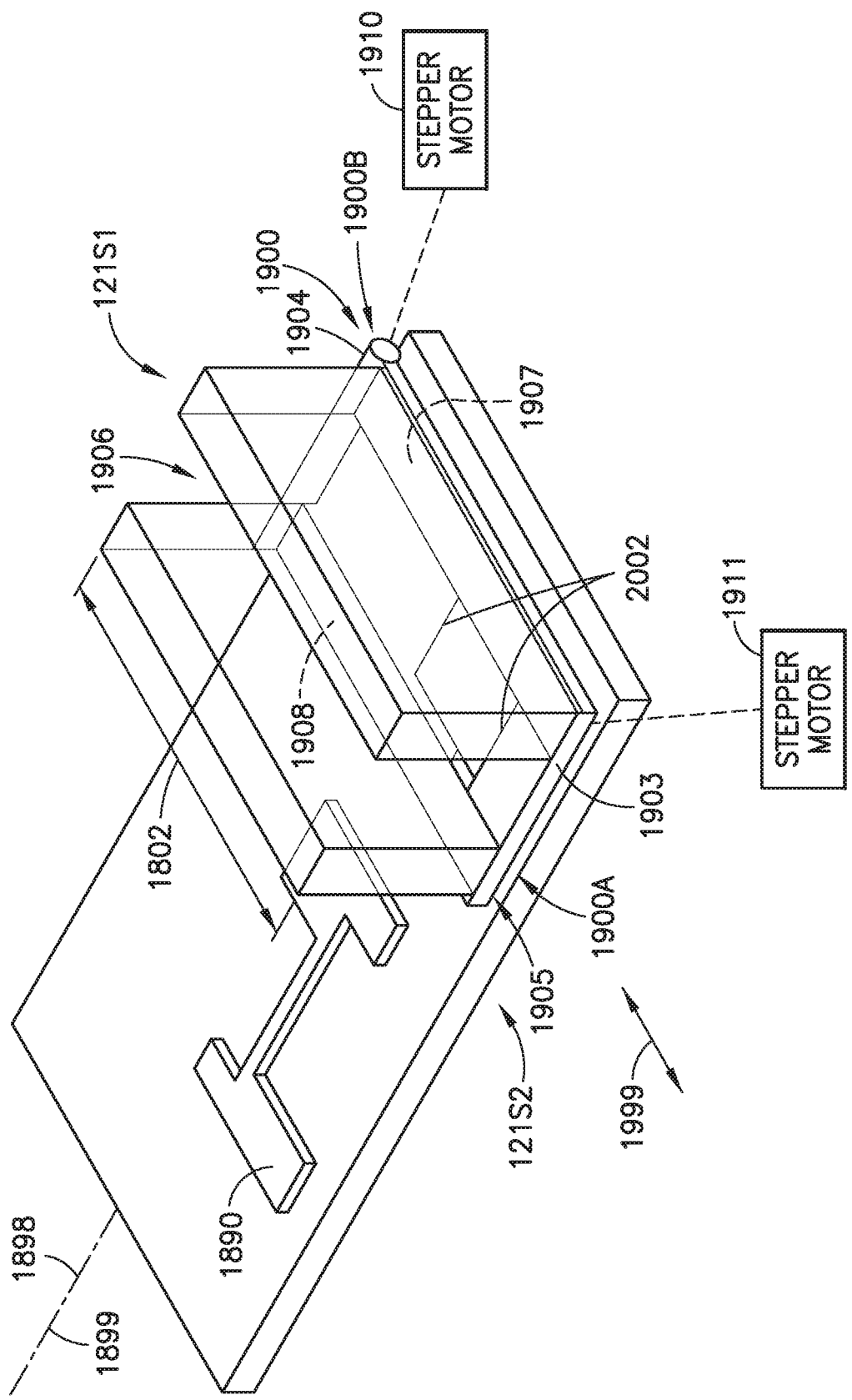

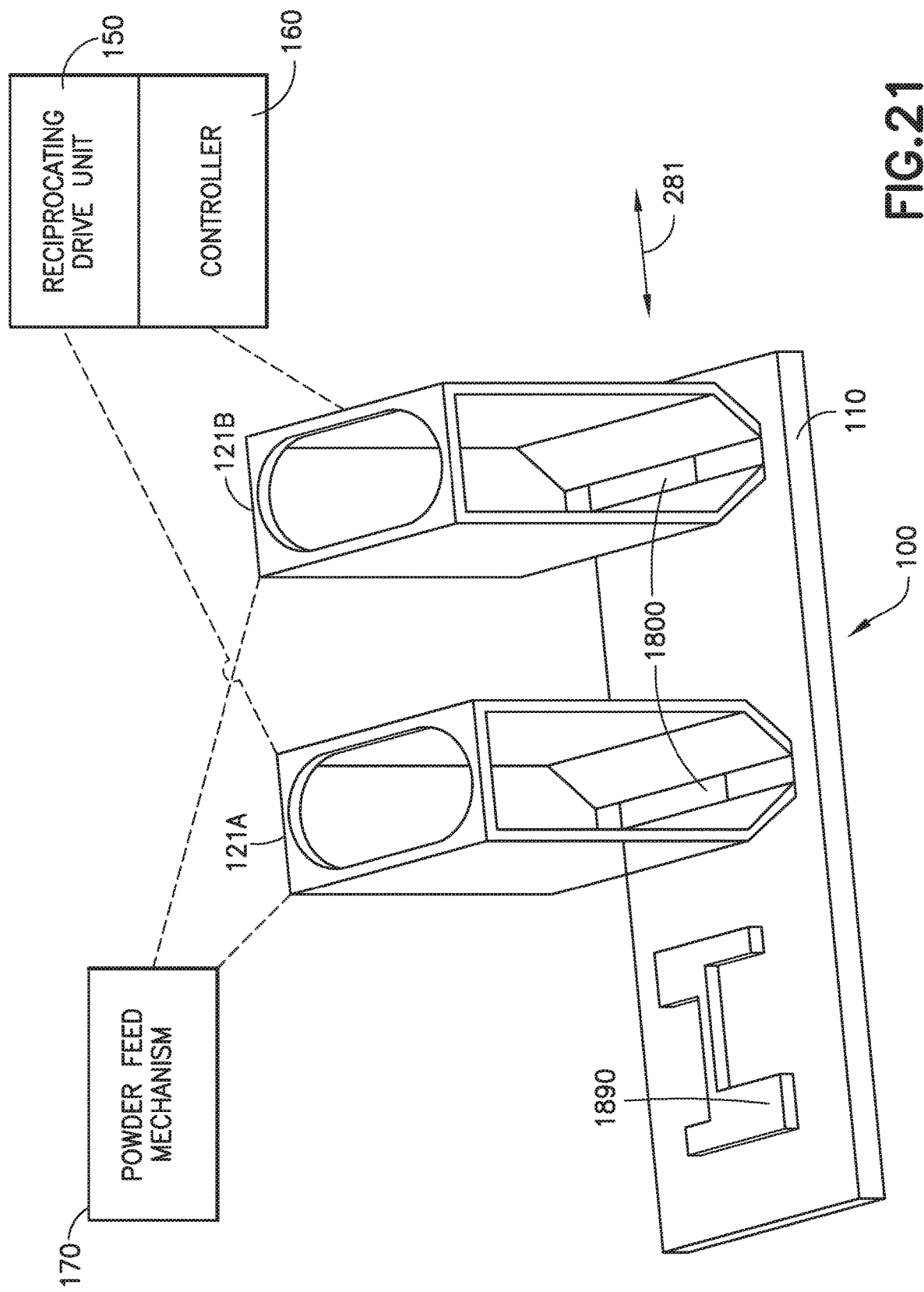

POWDER DISPENSING UNIT, POWDER SPREADING UNIT, AND A VIBRATORY COMPACTION SYSTEM OF AN ADDITIVE MANUFACTURING SYSTEM AND METHODS THEREFOR

CROSS-REFERENCE TO RELATED APPLICATIONS

This patent application is related to U.S. patent application Ser. No. 16/146,306 and filed on Sep. 28, 2018, U.S. patent application Ser. No. 16/146,314 and filed on Sep. 28, 2018, and U.S. patent application Ser. No. 16/146,323 and filed on Sep. 28, 2018, the disclosures of which are incorporated by reference herein in their entireties. For further identification of the aforementioned related applications, it is noted that the as filed title is the same for this patent application and the aforementioned related patent applications.

BACKGROUND

1. Field

The exemplary embodiments generally relate to additive manufacturing and more particularly to powder deposition and powder spreading in powder-based additive manufacturing systems.

2. Brief Description of Related Developments

Generally, in additive manufacturing, powder is spread on a build plate (or on a powder bed formed by a previous layer of powder deposited on the build plate) and then fused together to form a desired part/article of manufacture. Fusing of the particles may be achieved with lasers or any other suitable energy source configured to fuse the powder particles together. Generally, powder is spread on the build plate or powder bed with a doctor blade or roller that pushes a heap of powder from a powder reservoir, located adjacent the build plate, across the build plate or powder bed.

The powder being pushed across the build plate or powder bed by the doctor blade or roller is generally spread over an area of the build plate that is larger than the part being produced. The spreading of the powder results in extra powder being disposed on the build plate that is reclaimed for re-use. The reclamation of the extra powder increases production cycle time, increases production costs, and reduces an amount of powder available for manufacturing the part (e.g., more powder than necessary to manufacture the part must be provided).

In addition to the extra powder on the build plate, the spreading of the powder on the build plate or powder bed with the doctor blade or roller may result in an inconsistent and non-uniform powder distribution across the build plate or powder bed. For example, the doctor blade or roller may drag powder particles across the build plate which may produce streaks in the powder being spread and/or reduce a packing density (e.g., an amount of powder within a predetermined area of the build plate) of the powder on the build plate. Where a roller is used to spread the powder, powder particles may stick to the roller and create craters within the powder bed. The streaks, craters, and/or the decrease in the packing density may increase porosity in the part and/or decrease the adhesion between deposited and fused layers of powder.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to an additive manufacturing system comprising: a build plate; at least one recoater blade configured to spread powder onto the build plate; and at least one vibration mechanism coupled to one or more of the build plate and the at least one recoater blade.

Another example of the subject matter according to the present disclosure relates to a vibratory compaction system for an additive manufacturing system having a build plate and at least one recoater blade configured to spread powder onto the build plate, the vibratory compaction system comprising: at least one vibration mechanism coupled to one or more of the build plate and the at least one recoater blade; and a controller coupled to the at least one vibration mechanism, the controller being configured to control activation of the at least one vibration mechanism so that vibratory pulses are induced within the powder to effect compaction of the powder on the build plate.

Still another example of the subject matter according to the present disclosure relates to a method for compacting powder on a build plate of an additive manufacturing system where the additive manufacturing system has the build plate and at least one recoater blade configured to spread powder onto the build plate, the method comprising: controlling, with a controller, activation of at least one vibration mechanism so that vibratory pulses are induced within the powder to effect compaction of the powder on the build plate; wherein the at least one vibration mechanism is coupled to one or more of the build plate and the at least one recoater blade.

BRIEF DESCRIPTION OF THE DRAWINGS

Figure 1:
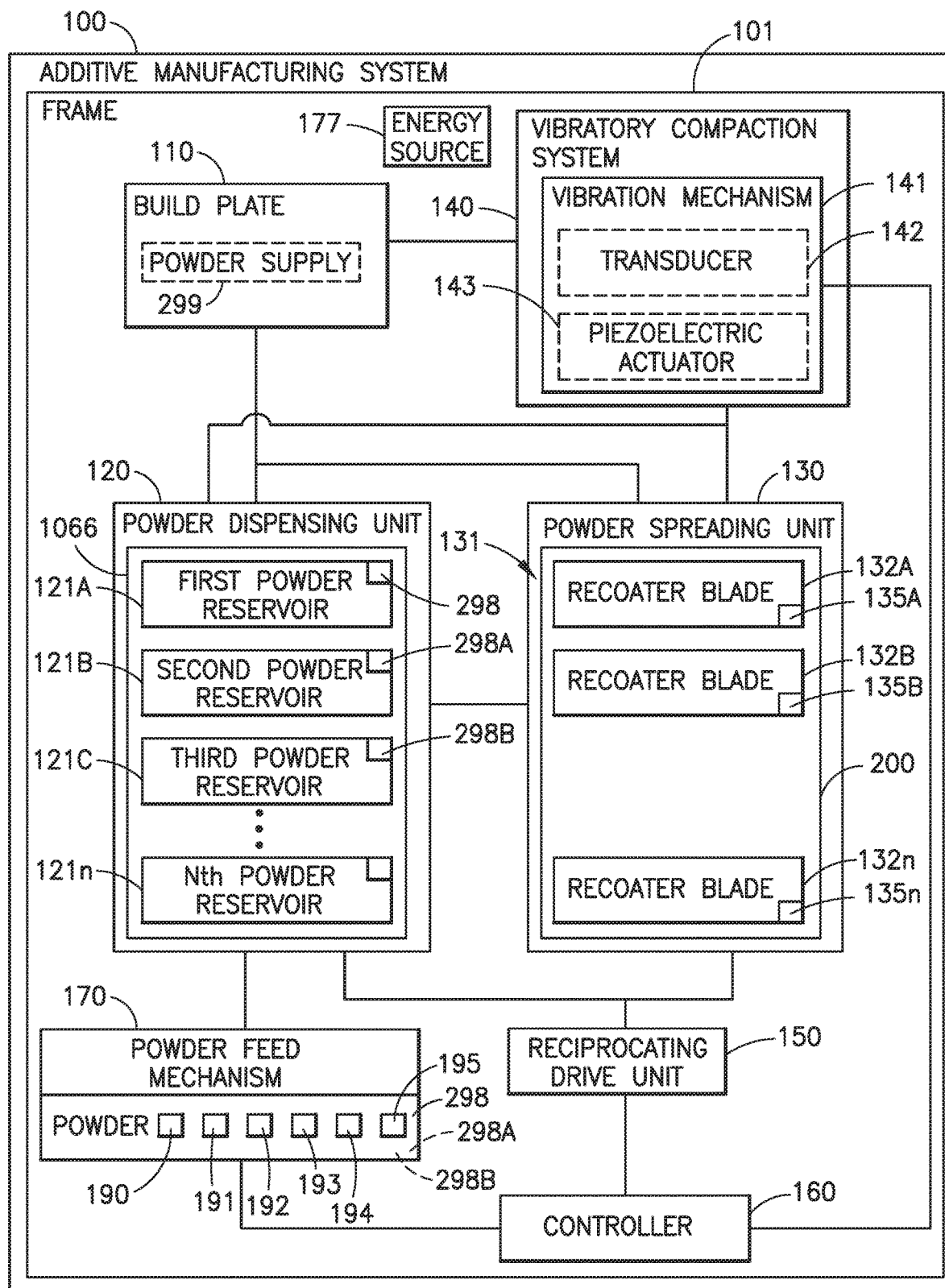
Figure 2A:
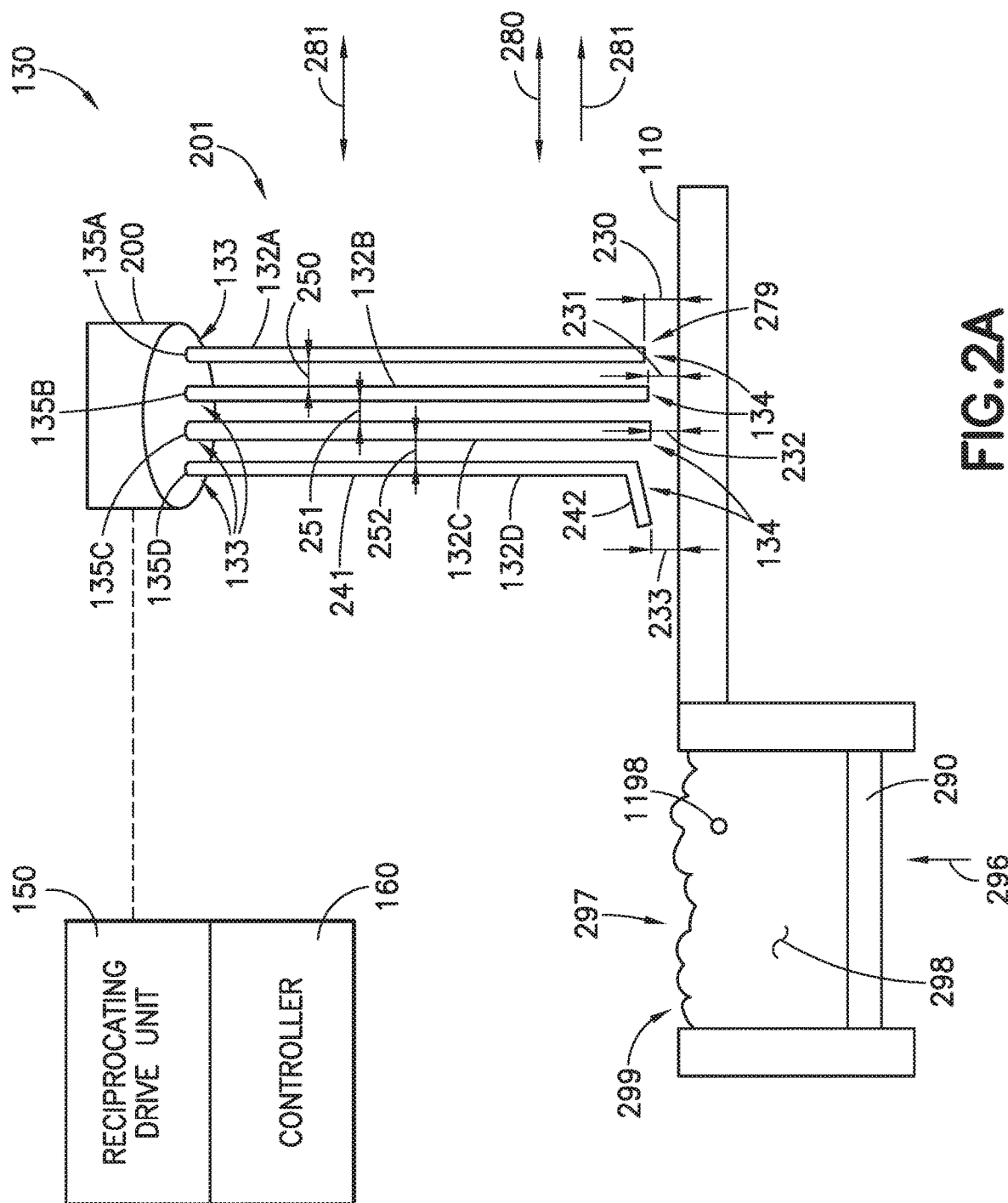
Figure 2B:
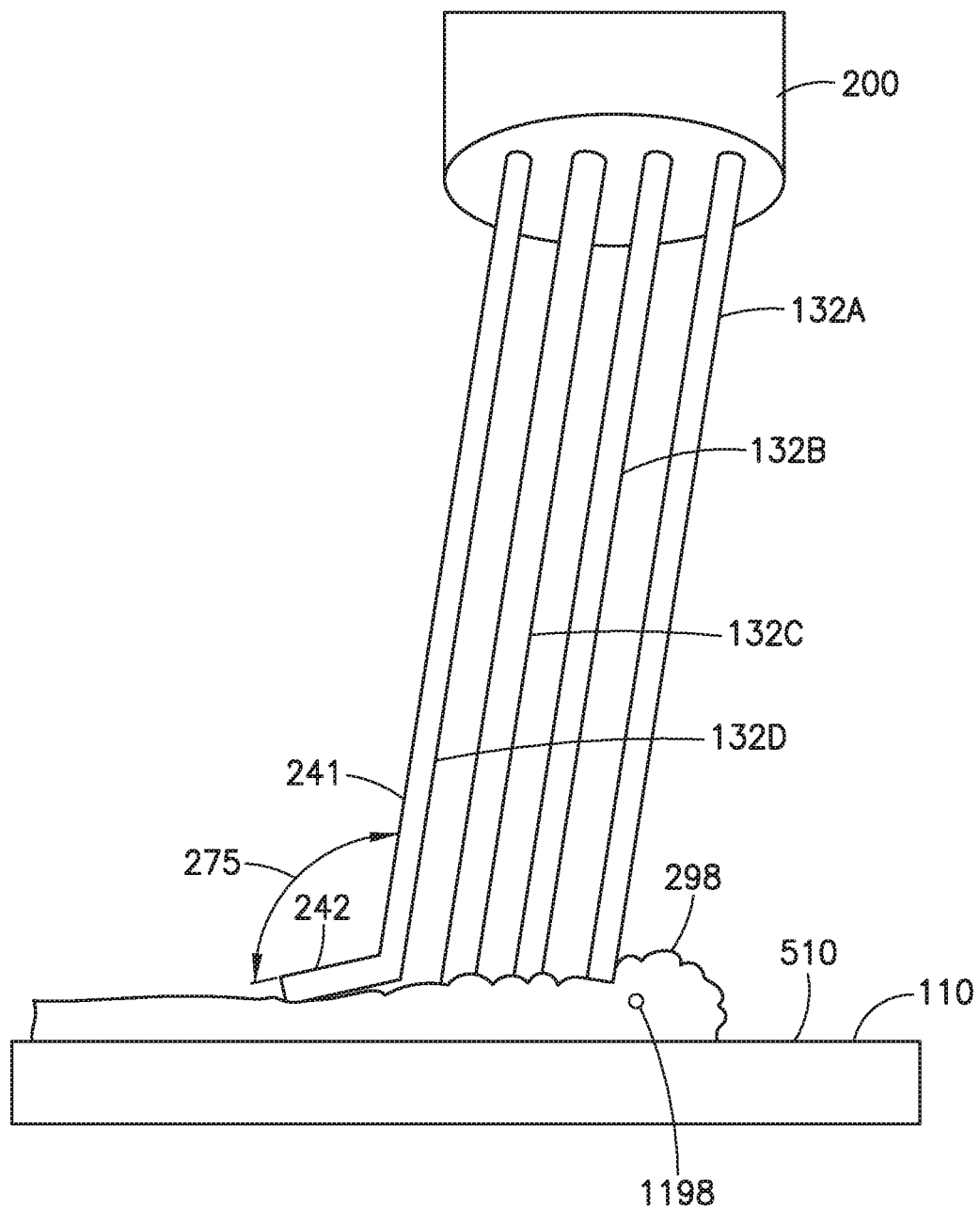
Figure 3:
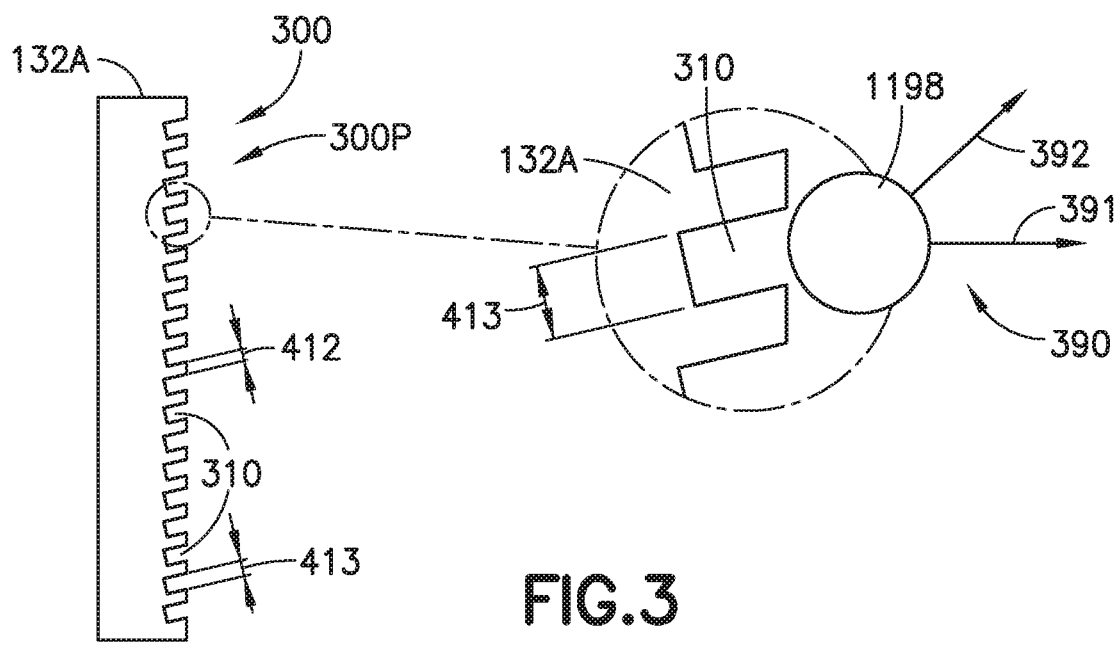
Figure 4:
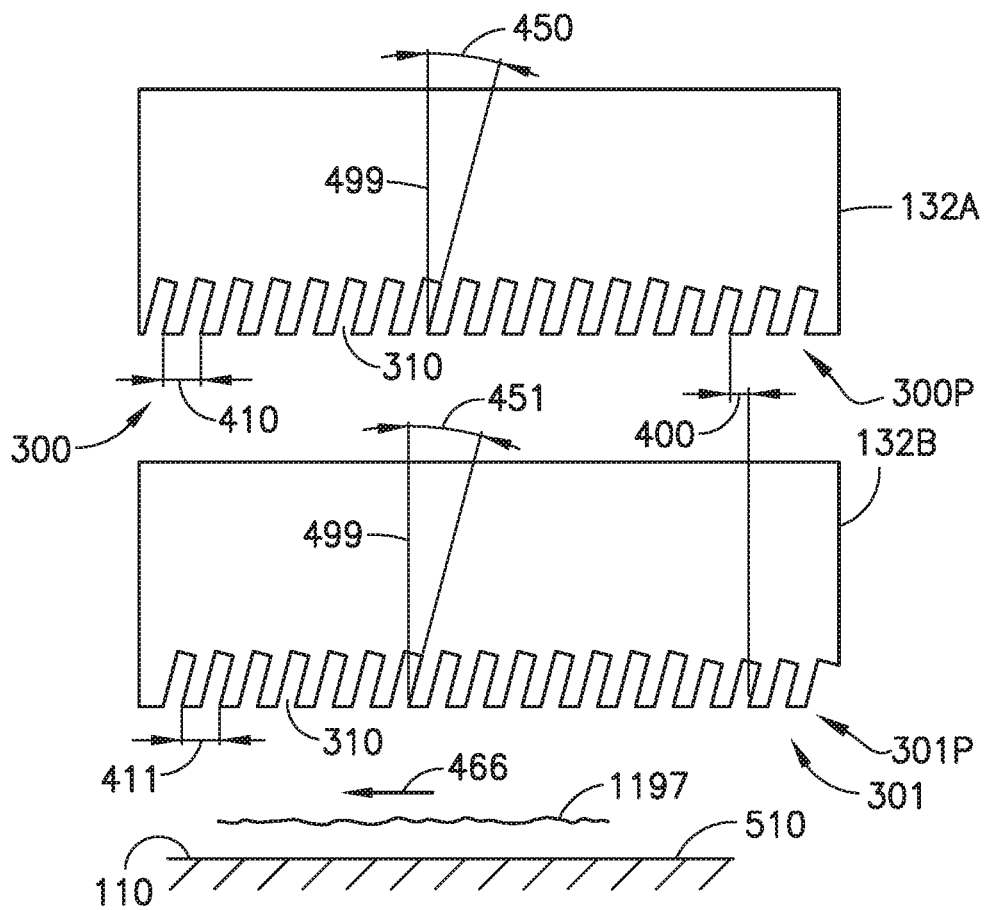
Figure 5:
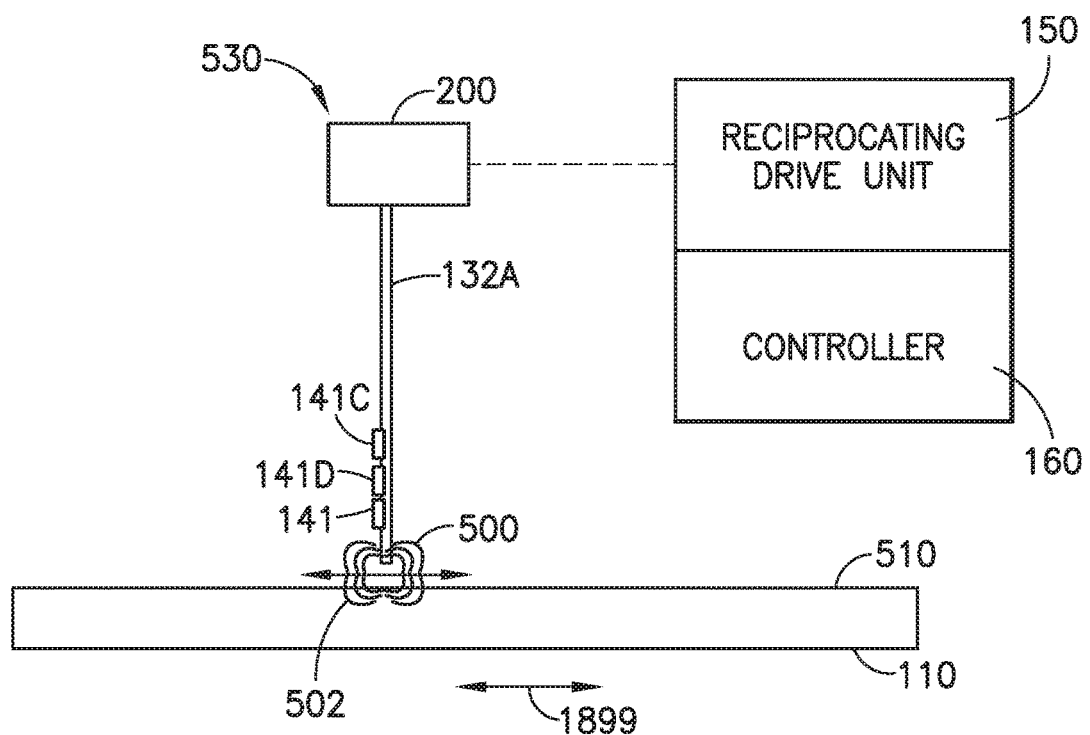
Figure 6:
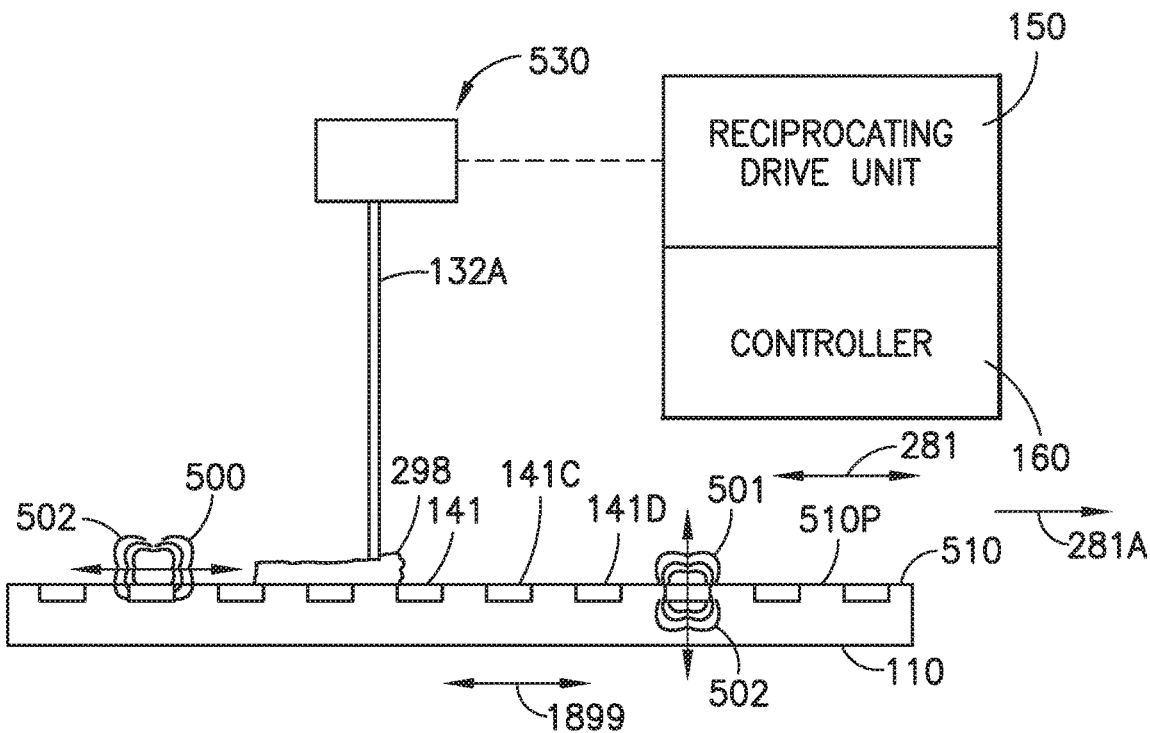
Figure 7:
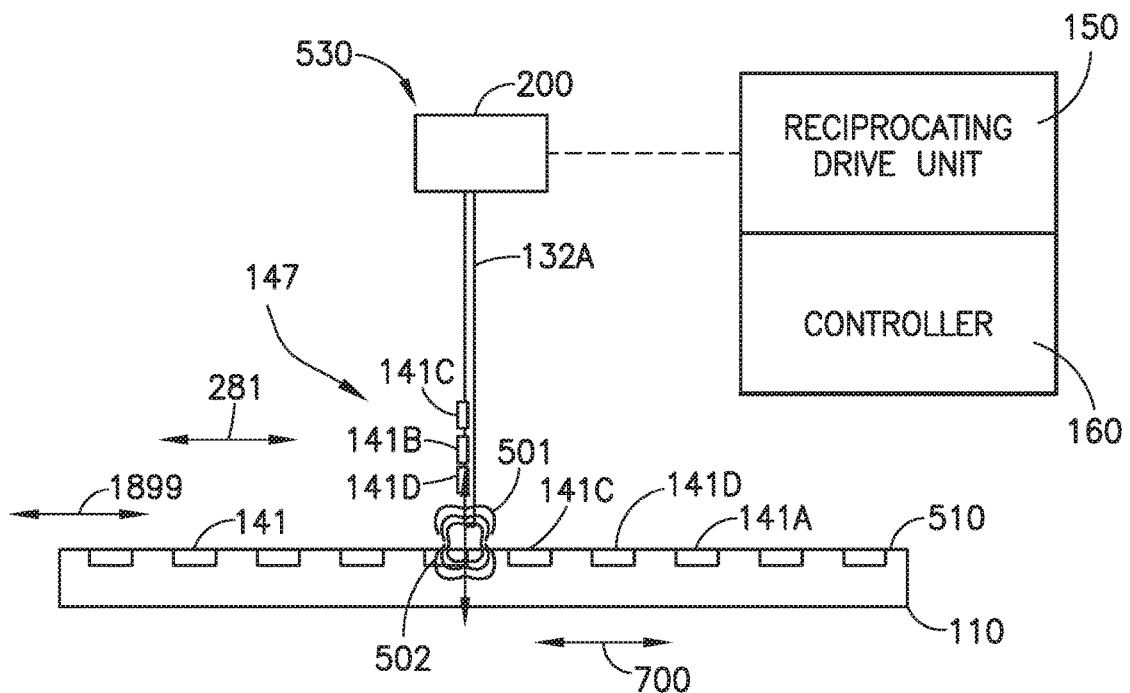
Figure 8:
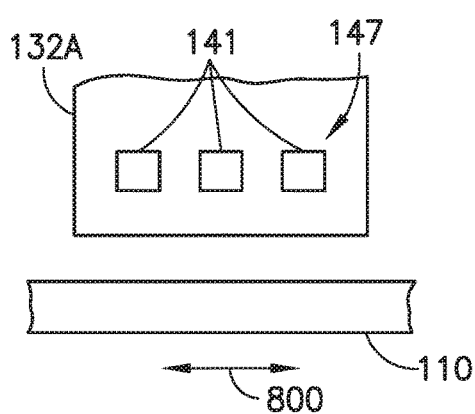
Figure 9:
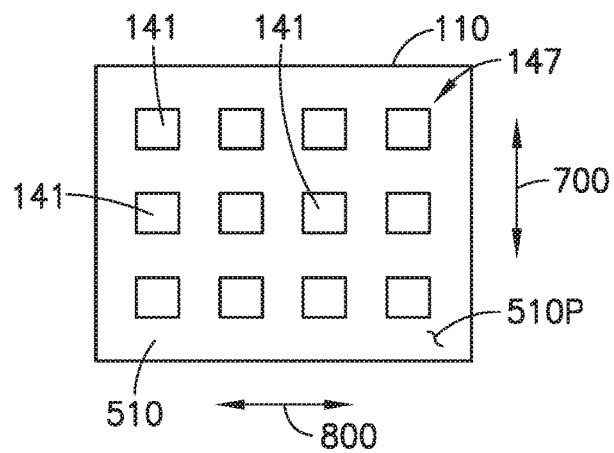
Figure 10:
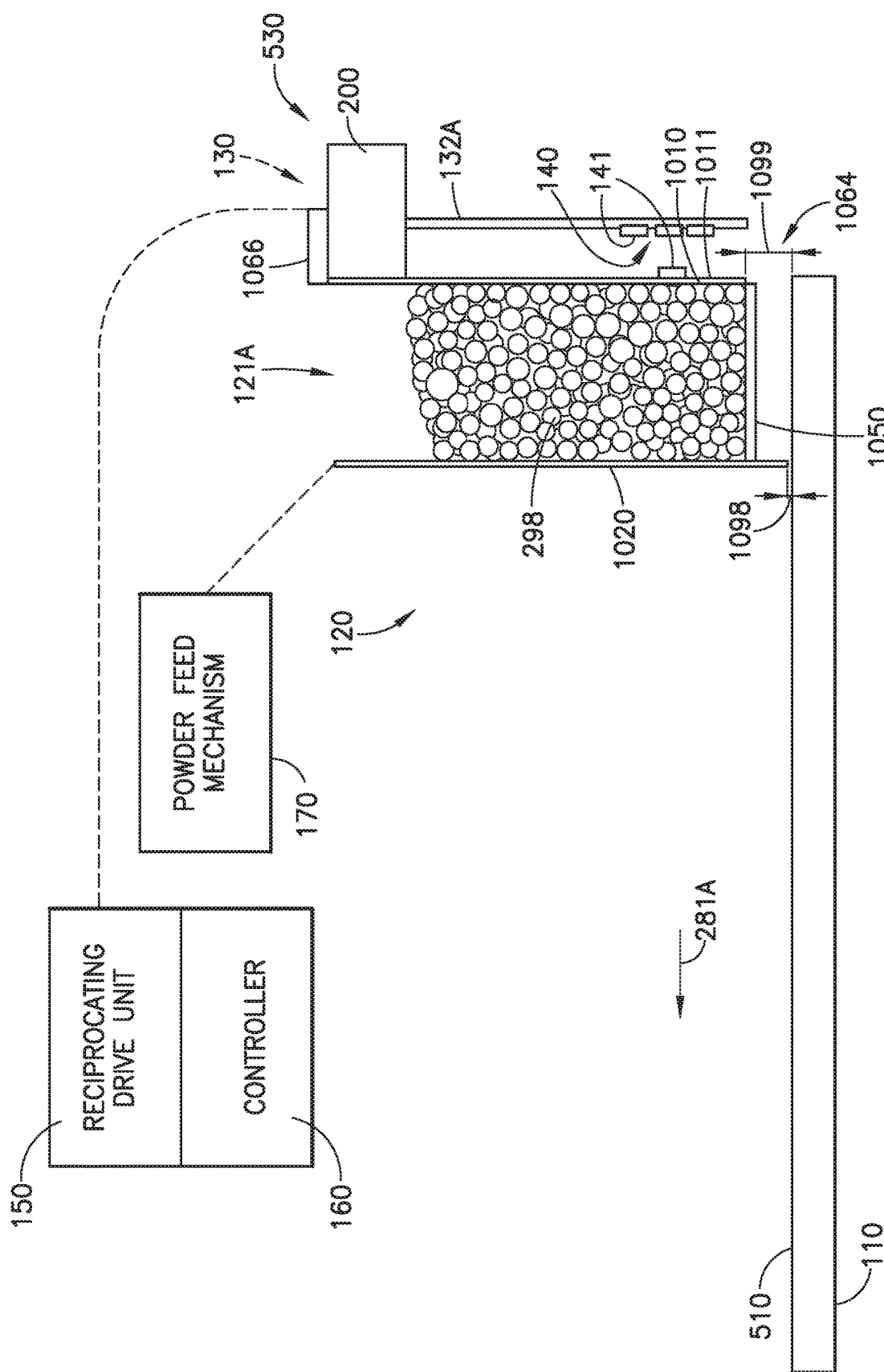
Figure 11:
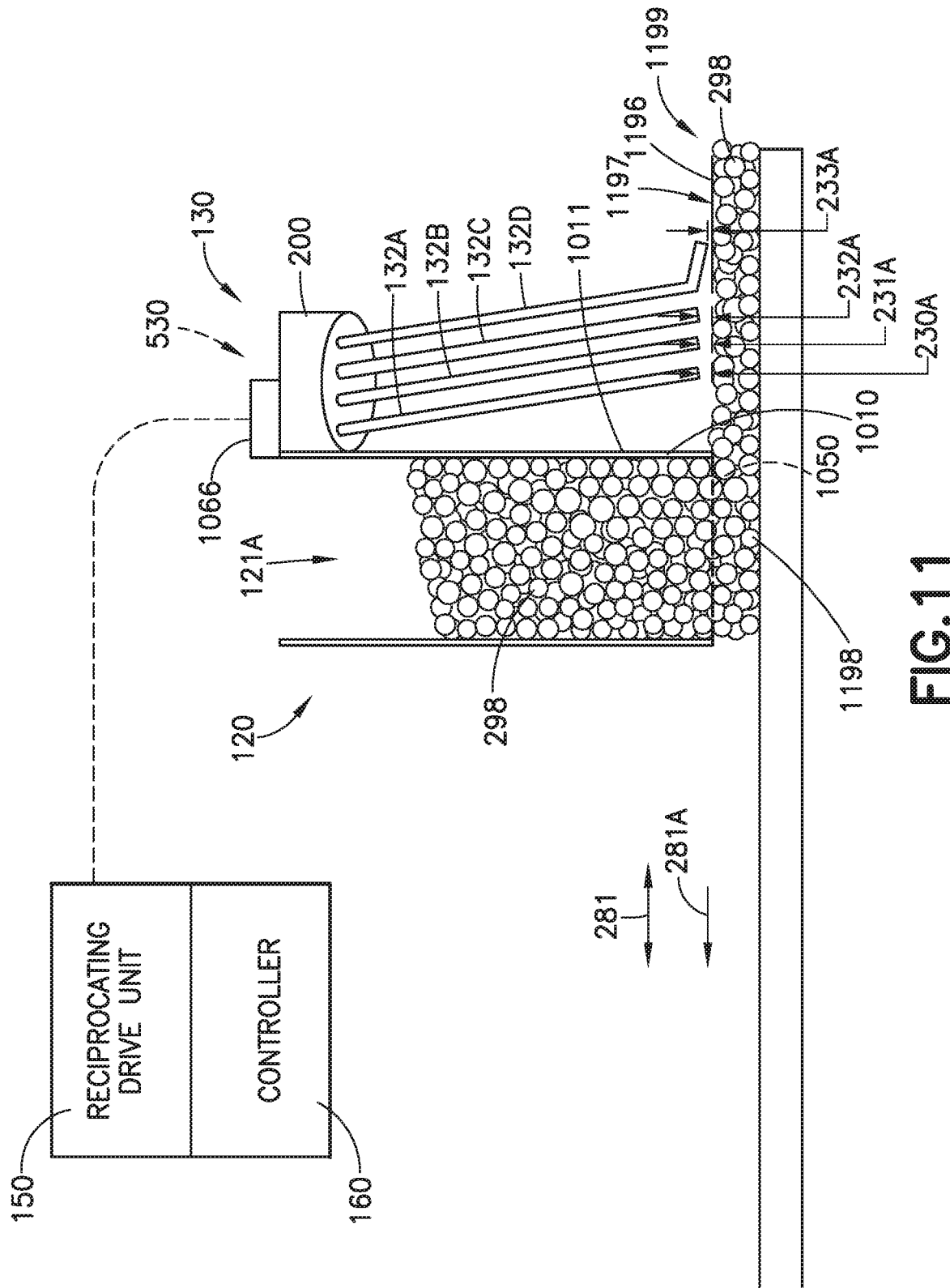
Figure 12A:
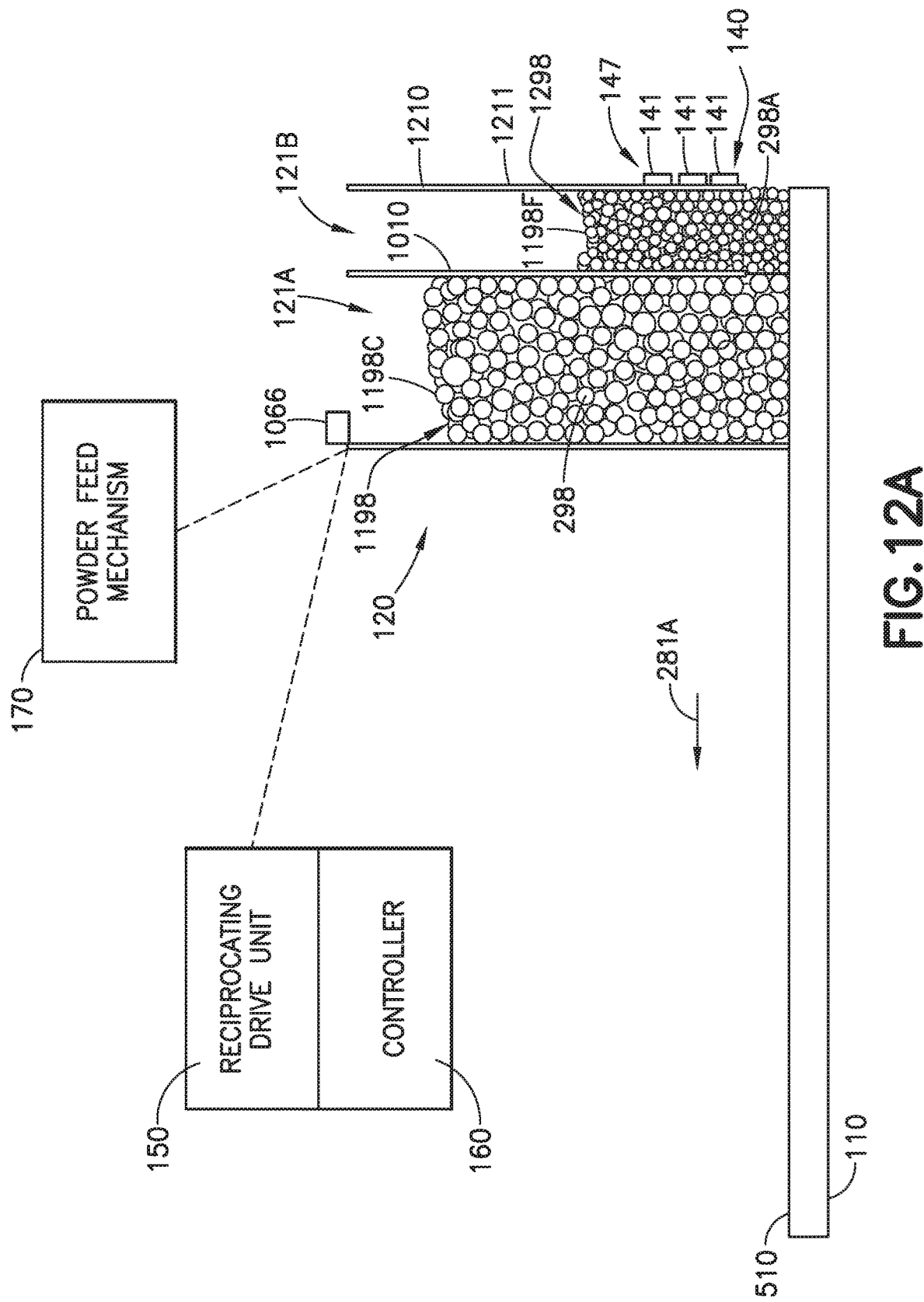
Figure 13:
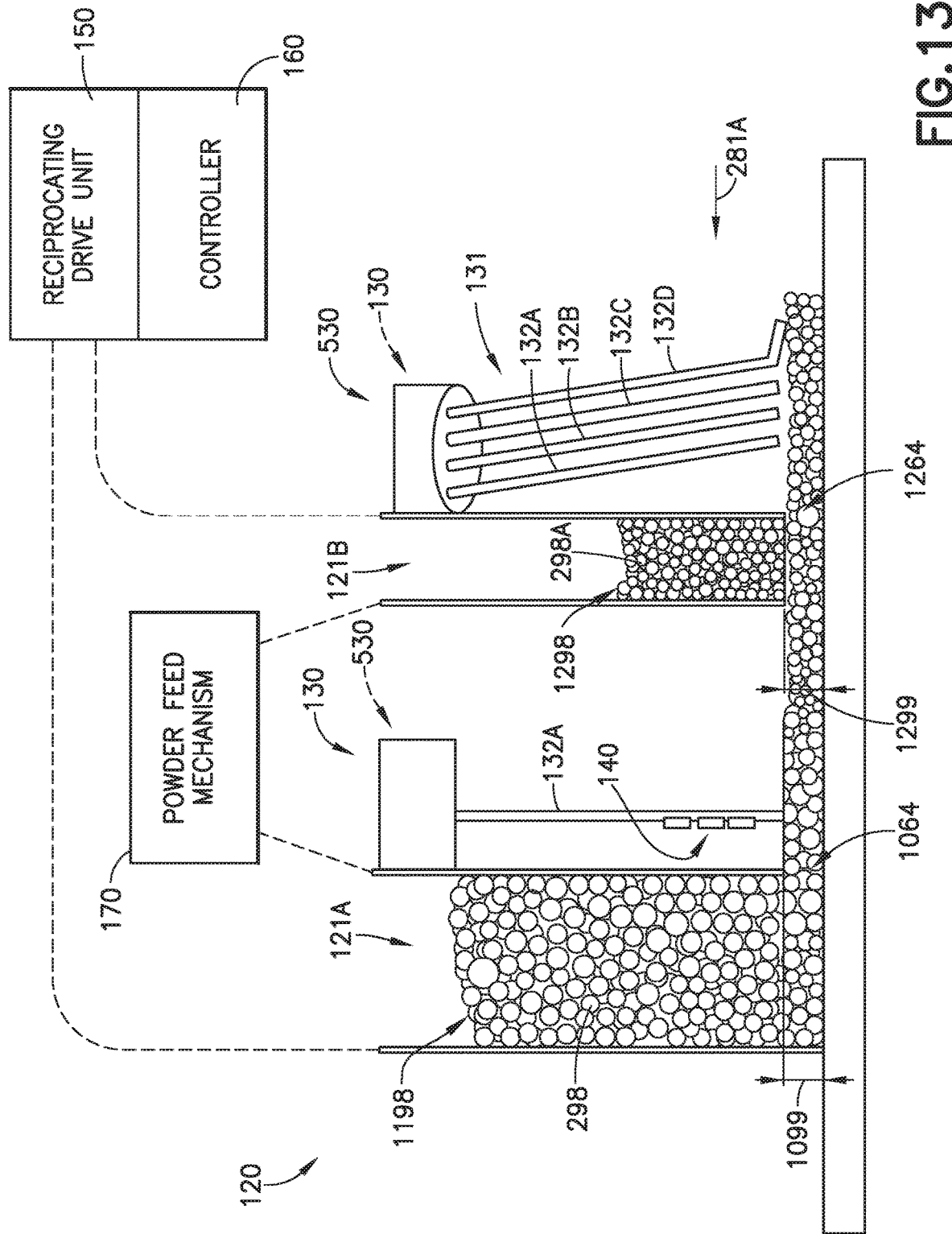
Figure 14:
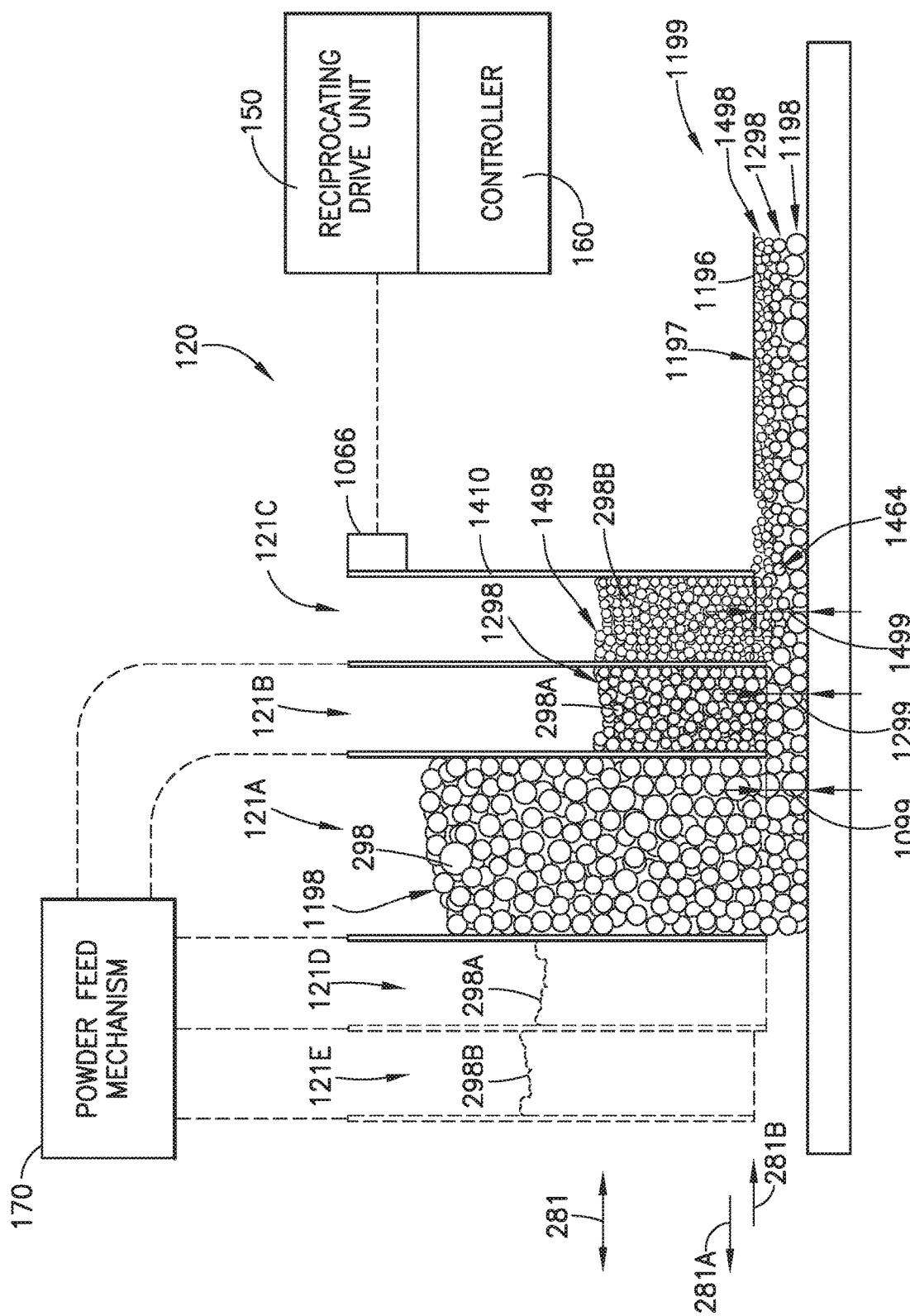
Figure 15:
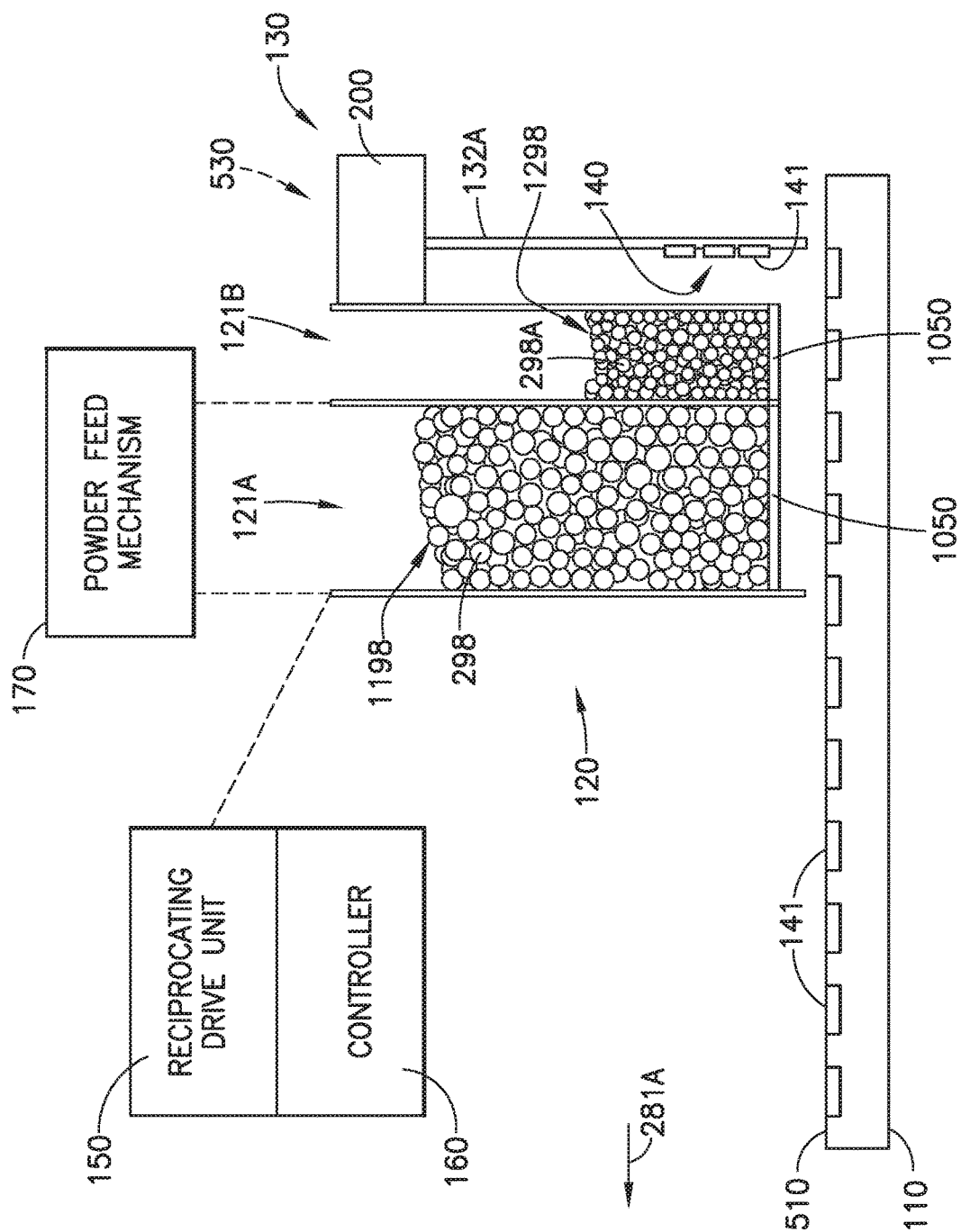
Figure 16:
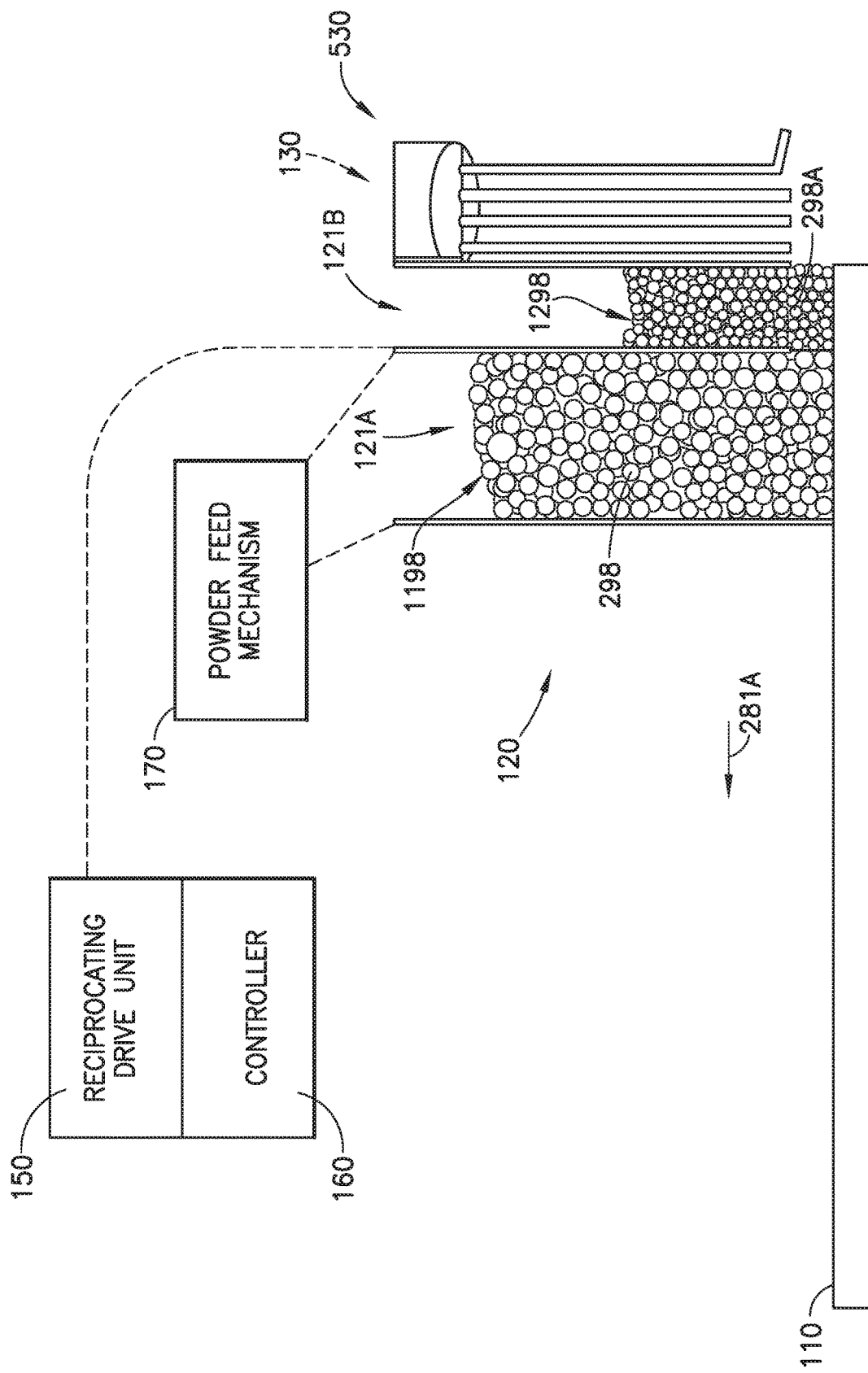
Figure 18A:
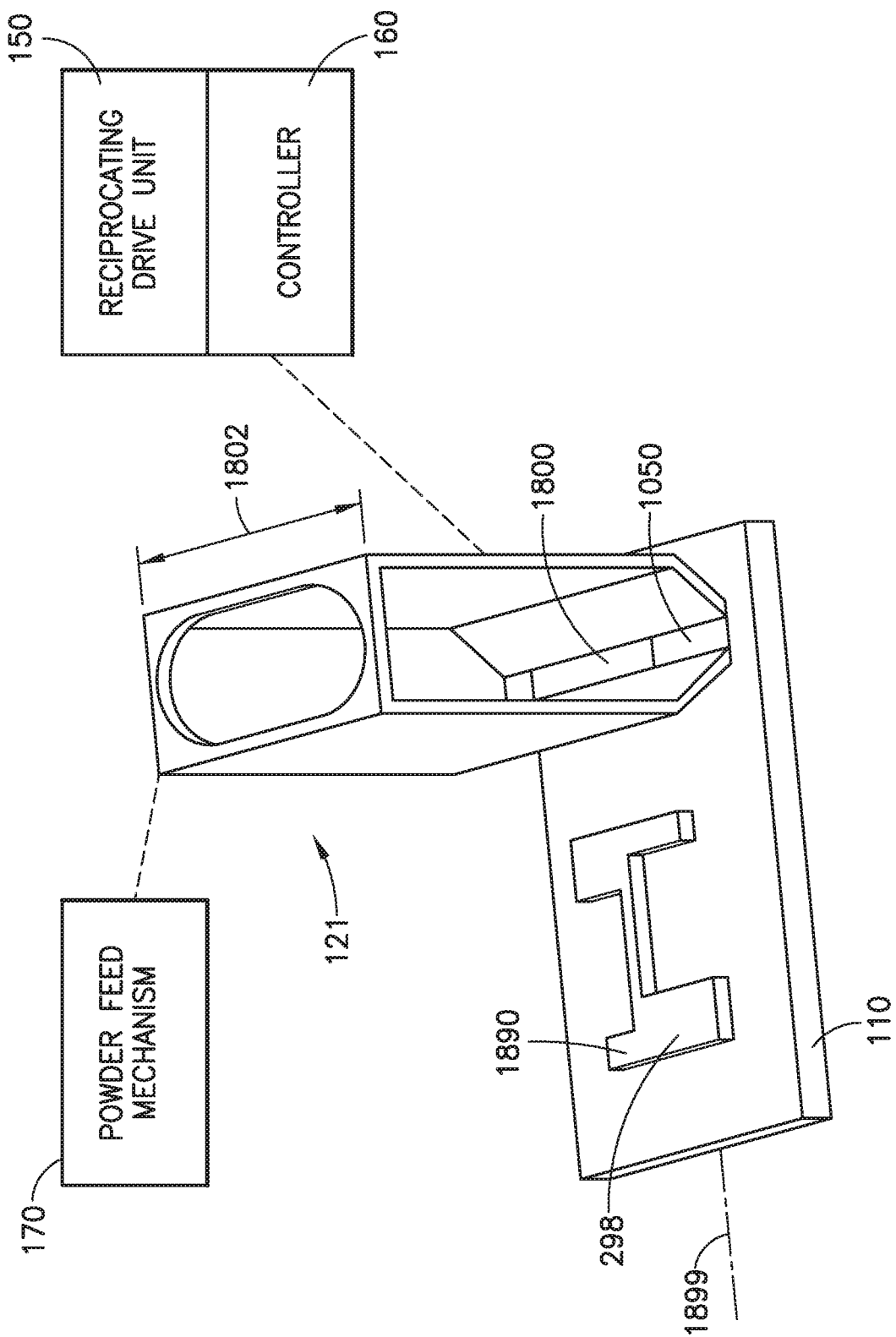
Figure 18B:
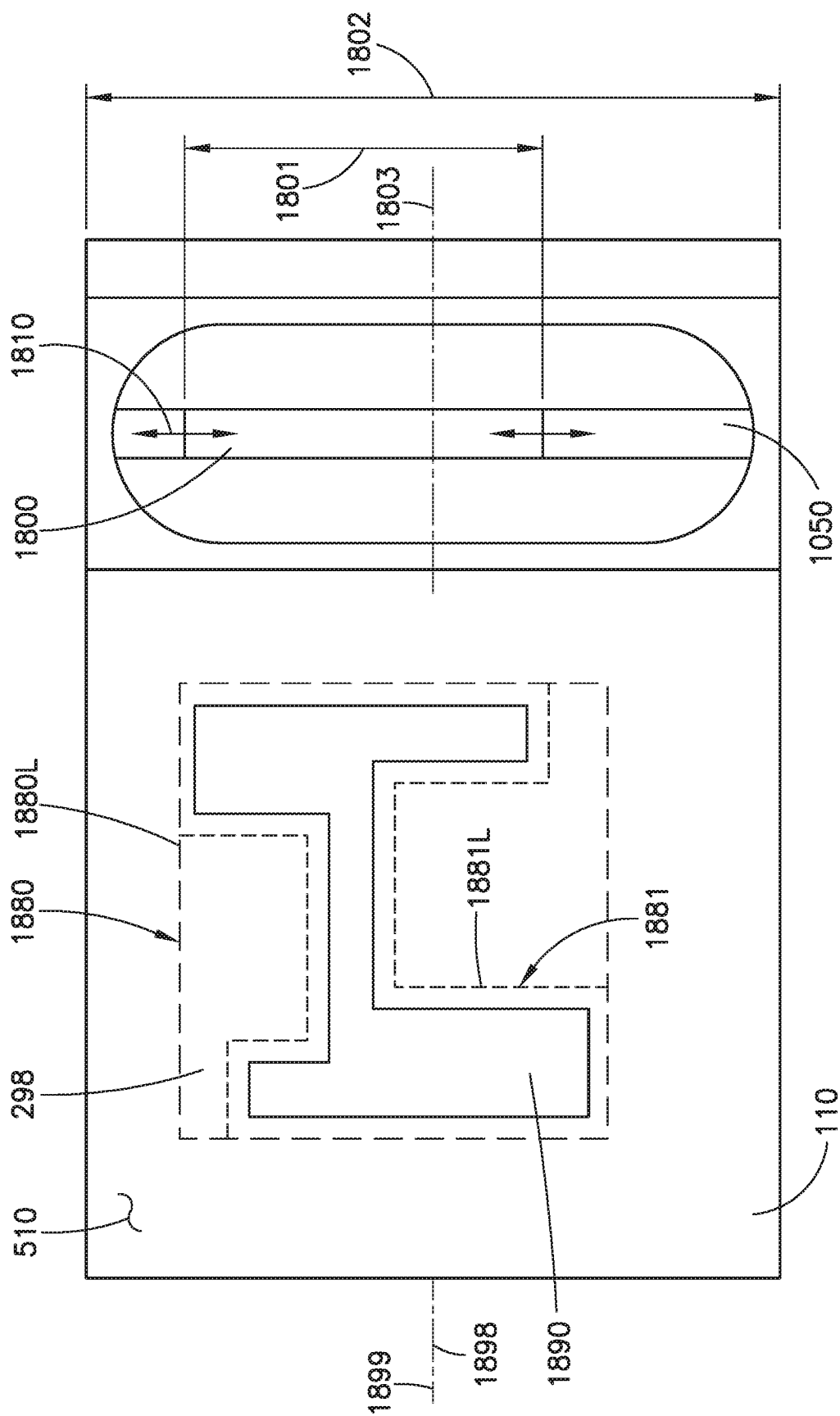
Figure 19:
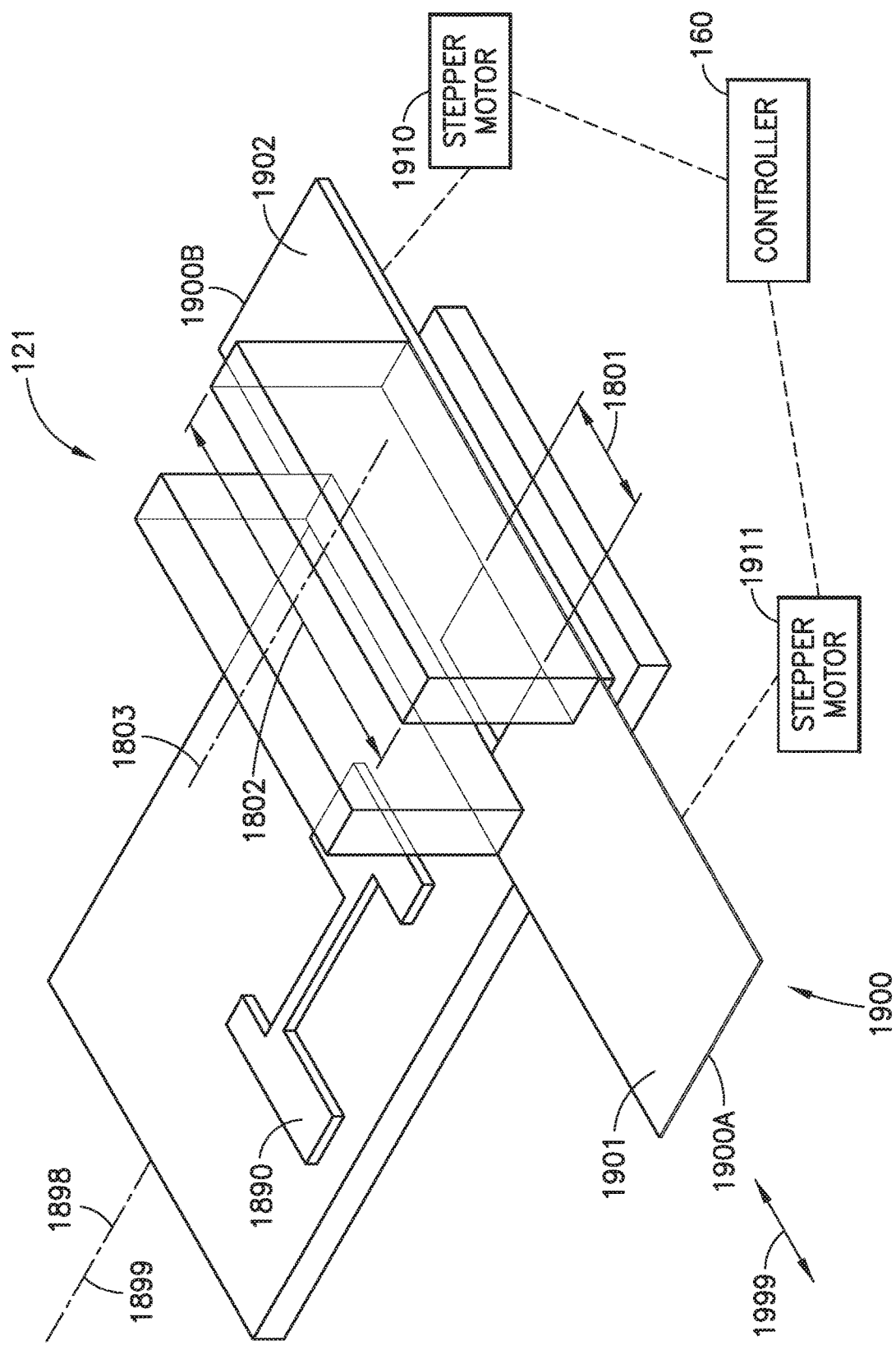
Figure 20B:
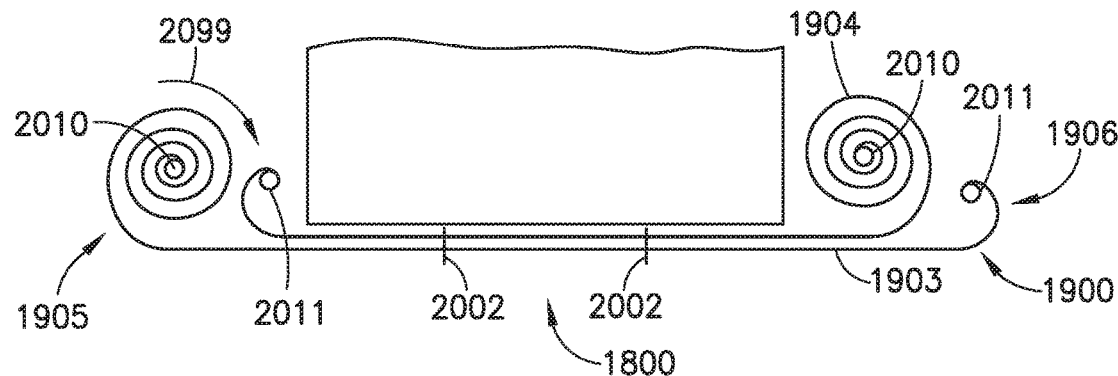
Figure 20C:
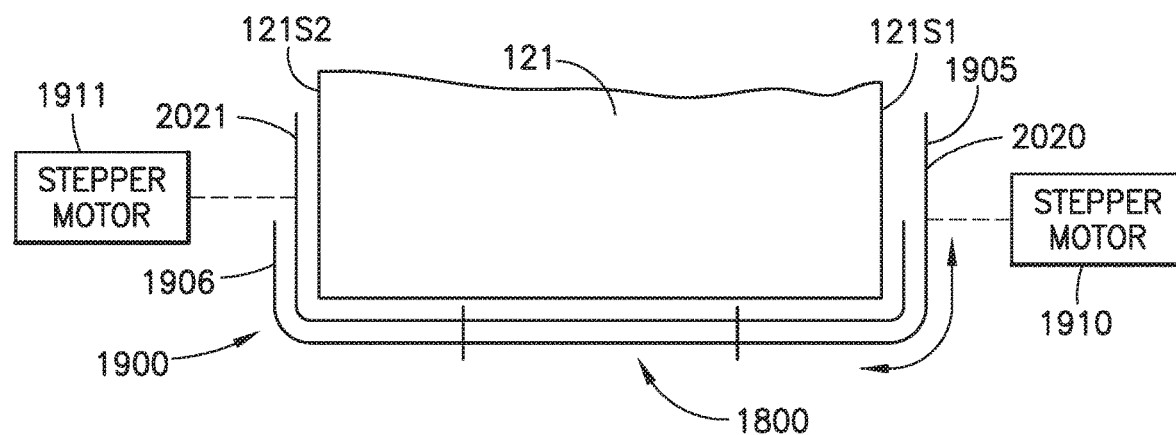
Figure 20D:
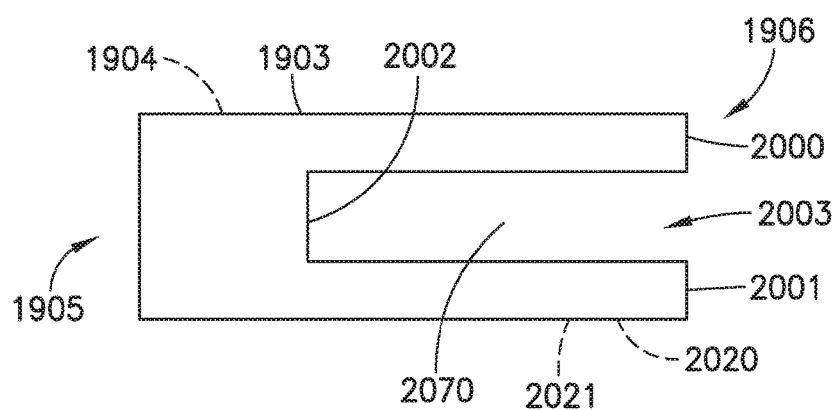
Figure 22:
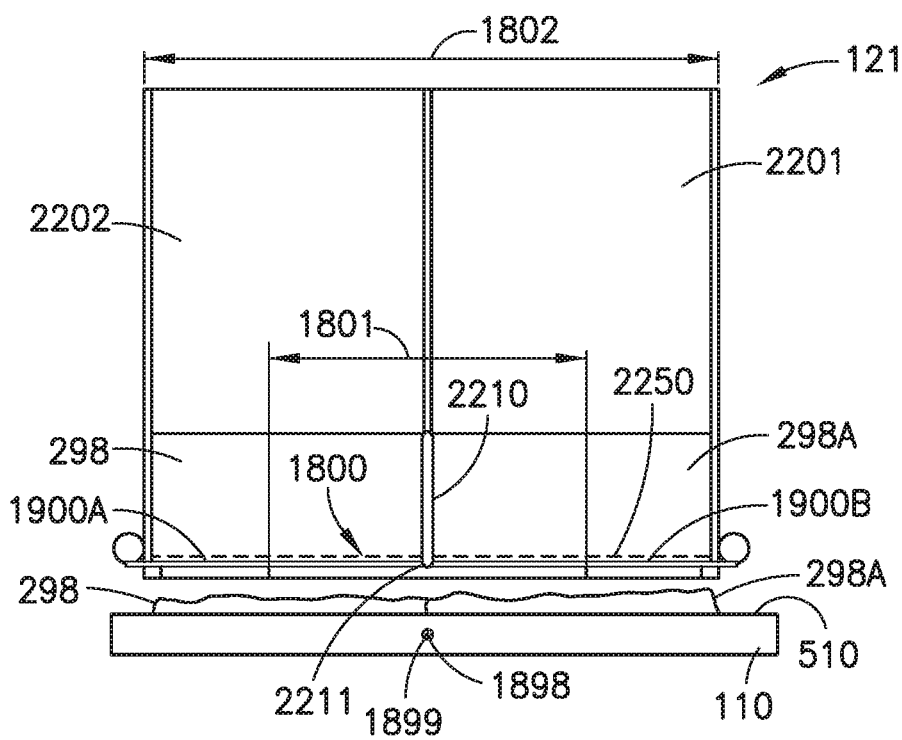
Figure 23:
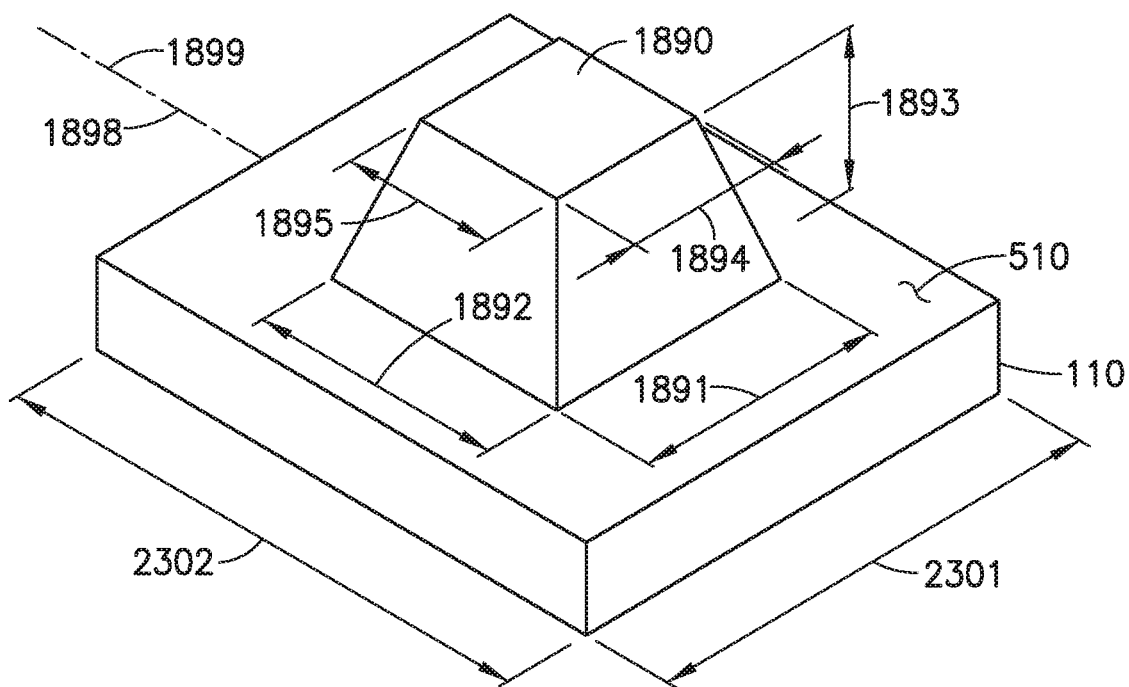
Figure 24:
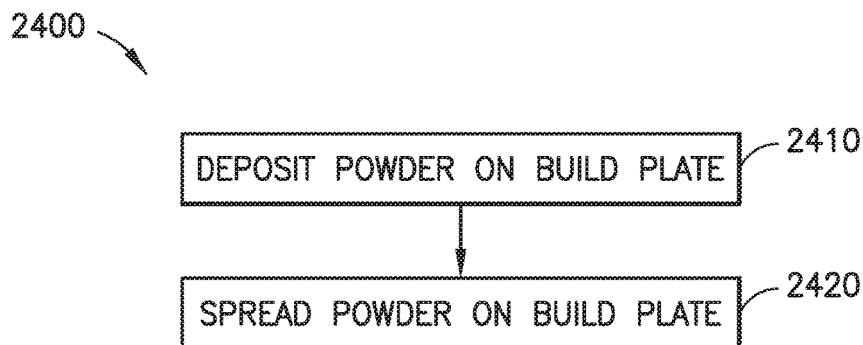
Figure 25:
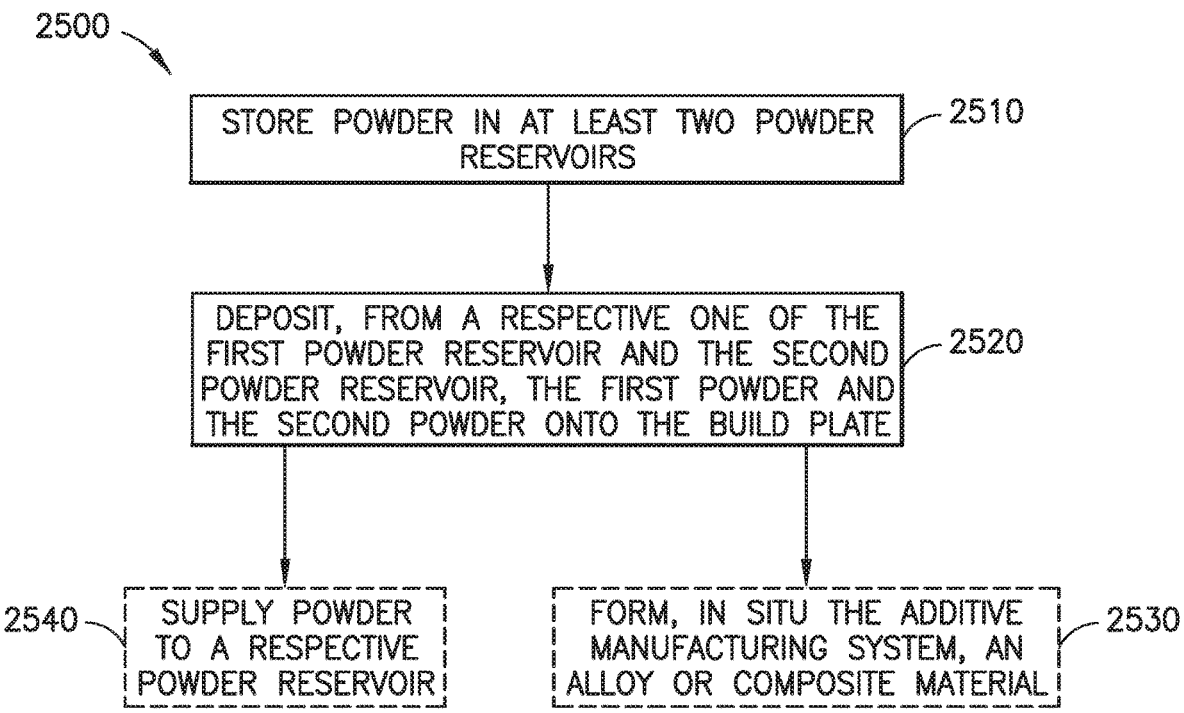
Figure 26:
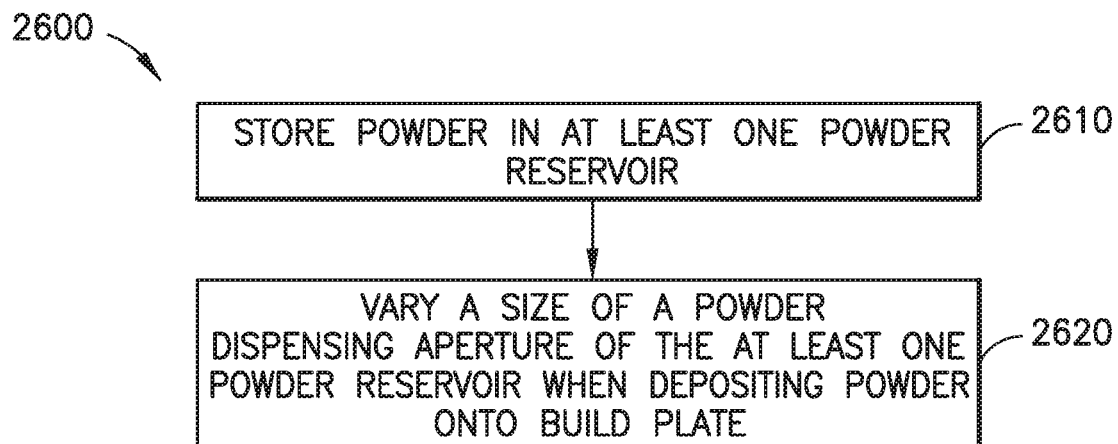
Figure 27:
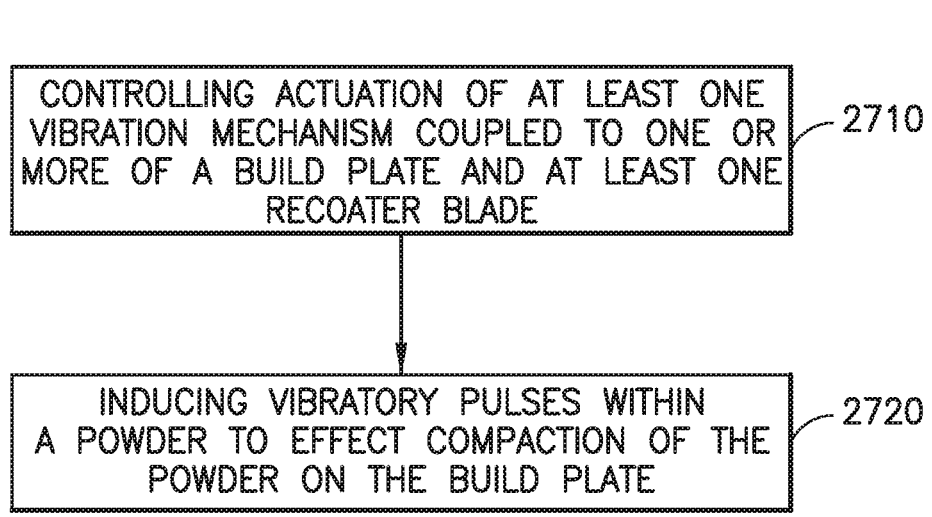

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic block diagram of an additive manufacturing system in accordance with aspects of the present disclosure;

FIG. 2A is a side view of a powder spreading unit of the additive manufacturing system in accordance with aspects of the present disclosure;

FIG. 2B is another side view of the powder spreading unit of FIG. 2A in accordance with aspects of the present disclosure;

FIG. 3 is a plan view of a portion of a recoater blade of a powder spreading unit of the additive manufacturing system of FIG. 1 in accordance with aspects of the present disclosure, where a portion of the recoater blade and a powder particle have been magnified;

FIG. 4 is a plan view of a portion of a pair of recoater blades of a powder spreading unit of the additive manufacturing system of FIG. 1 in accordance with aspects of the present disclosure;

FIG. 5 is a side view of a powder spreading unit and build plate of the additive manufacturing system of FIG. 1 in accordance with aspects of the present disclosure;

FIG. 6 is a side view of a powder spreading unit and build plate of the additive manufacturing system of FIG. 1 in accordance with aspects of the present disclosure;

FIG. 7 is a side view of a powder spreading unit and build plate of the additive manufacturing system of FIG. 1 in accordance with aspects of the present disclosure;

FIG. 8 is a plan view of a portion of a recoater blade of a powder spreading unit of the additive manufacturing system of FIG. 1 in accordance with aspects of the present disclosure;

FIG. 9 is a top view of a portion of a build plate of the additive manufacturing system of FIG. 1 in accordance with aspects of the present disclosure;

FIG. 10 is a plan view of a powder dispensing unit and build plate of the additive manufacturing system of FIG. 1 in accordance with aspects of the present disclosure;

FIG. 11 is a plan view of a powder dispensing unit and build plate of the additive manufacturing system of FIG. 1 in accordance with aspects of the present disclosure;

FIG. 12A is a plan view of a powder dispensing unit and build plate of the additive manufacturing system of FIG. 1 in accordance with aspects of the present disclosure;

FIG. 12B is a plan view of the powder dispensing unit and build plate of FIG. 12A illustrating the deposition of powder onto the build plate in accordance with aspects of the present disclosure;

FIG. 13 is a plan view of a powder dispensing unit and build plate of the additive manufacturing system of FIG. 1 in accordance with aspects of the present disclosure;

FIG. 14 is a plan view of a powder dispensing unit and build plate of the additive manufacturing system of FIG. 1 in accordance with aspects of the present disclosure;

FIG. 15 is a plan view of a powder dispensing unit and build plate of the additive manufacturing system of FIG. 1 in accordance with aspects of the present disclosure;

FIG. 16 is a plan view of a powder dispensing unit and build plate of the additive manufacturing system of FIG. 1 in accordance with aspects of the present disclosure;

FIG. 17 is a plan view of a powder dispensing unit and build plate of the additive manufacturing system of FIG. 1 in accordance with aspects of the present disclosure;

FIG. 18A is a partial perspective view of a powder dispensing unit and build plate of the additive manufacturing system of FIG. 1 in accordance with aspects of the present disclosure;

FIG. 18B is a partial top view of the powder dispensing unit and build plate of FIG. 18A in accordance with aspects of the present disclosure;

FIG. 19 is a partial perspective view the powder dispensing unit and build plate of FIG. 18A in accordance with aspects of the present disclosure;

FIG. 20A is a partial perspective view of the powder dispensing unit and build plate of FIG. 18A in accordance with aspects of the present disclosure;

FIG. 20B is a partial side view of the powder dispensing unit of FIG. 20A in accordance with aspects of the present disclosure;

FIG. 20C is a partial side view of the powder dispensing unit of FIG. 20A in accordance with aspects of the present disclosure;

FIG. 20D is a plan view of a portion of the powder dispensing unit of FIG. 20A in accordance with aspects of the present disclosure;

FIG. 21 is a partial perspective view of a powder dispensing unit and build plate of the additive manufacturing system of FIG. 1 in accordance with aspects of the present disclosure;

FIG. 22 is a sectioned side view of a powder dispensing unit of the additive manufacturing system of FIG. 1 in accordance with aspects of the present disclosure;

FIG. 23 is a perspective illustration of a part produced by the additive manufacturing system of FIG. 1 in accordance with aspects of the present disclosure;

FIG. 24 is a flow diagram of a method for spreading powder on the build plate of the additive manufacturing system of FIG. 1 in accordance with aspects of the present disclosure;

FIG. 25 is a flow diagram of a method for compacting powder on the build plate of the additive manufacturing system of FIG. 1 in accordance with aspects of the present disclosure;

FIG. 26 is a flow diagram of a method for dispensing powder on the build plate of the additive manufacturing system of FIG. 1 in accordance with aspects of the present disclosure; and FIG. 27 is a flow diagram of a method for dispensing powder on the build plate of the additive manufacturing system of FIG. 1 in accordance with aspects of the present disclosure.

DETAILED DESCRIPTION

Referring to FIG. 1, the aspects of the present disclosure provide for an additive manufacturing system 100 that includes a build plate 110 and one or more of a powder spreading unit 130, a powder dispensing unit 120, and a vibratory compaction system 140.

The powder spreading unit 130 includes one or more recoater blades 132A-132n. In one aspect, the powder spreading unit 130 may be integrated with one or more of the powder dispensing unit 120 and the vibratory compaction system 140. In one aspect, the powder spreading unit 130 includes a plurality of recoater blades 131 (e.g., including at least two of the recoater blades 132A-132n) that are arranged relative to one another so as to have different spacing and/or angles between the recoater blades 132A-132n. One or more of the recoater blades 132A-132n may include serrated edges (see FIGS. 3 and 4), the serrations having various patterns and orientations, which may effect a uniform spreading of the powder on the build plate 110. The uniform spreading of the powder may provide a consistently dense part (e.g., an increase in packing density compared to non-serrated recoater blades and/or single recoater blades) and reduce the number of streaks and voids in the part (e.g., compared to non-serrated recoater blades and/or single recoater blades).

The plurality (or set) of recoater blades 131 are mounted to a base member 200 (FIG. 2A) at predetermined spacings relative to one another. The plurality of recoater blades 131 may also have differing gaps 230, 231, 232, 233 (see FIG. 2A) that represent a distance between the build plate 110 and the respective recoater blade 132A-132n; where the differing gaps 230, 231, 232, 233 correspond with differing gaps 230A, 231A, 232A, 233A (see FIG. 11) representing another distance between the powder bed 1199 and the respective recoater blade 132A-132n) so as to progressively compact the powder 298 deposited on the build plate 110 or powder bed 1199. The recoater blades 132A-132n may be mounted to the base member 200 with varying degrees of flexibility. The varying degrees of flexibility may change an angle of the respective recoater blades 132A-132n relative to the build plate 110 (e.g., compare FIGS. 2A and 2B noting the angle formed between the respective recoater blades 132A-132D, each of the base member 200 and the build plate 110)

to spread the powder on the build plate 110 or powder bed 1199 so that the powder particles 1198 (FIG. 11) freely move into respective positions on the build plate 110 or powder bed 1199 (e.g., substantially without creating forces on the particles that would drag the particles across the build plate 110 or powder bed 1199) and fill any gaps that may exist between previously deposited powder particles 1198. In one aspect, one of the recoater blades 132A-132n is provided with a compaction shoe (see second portion 242 of recoater blade 132D in FIG. 2A) that may effect compaction of the powder particles 1198 and a smoothing (e.g., bringing a portion of the powder particles 1198 forming a surface of the deposited powder or powder bed 1199 into substantially the same plane 1196, FIG. 11) of the powder bed 1199 surface 1197 (FIG. 11).

The vibratory compaction system 140 may be integrated with on one or more of the build plate 110, the powder spreading unit 130, and the powder dispensing unit 120. The vibratory compaction system 140 is configured to produce one or more of in-plane vibrations 500 (FIGS. 5 and 6) and out-of-plane vibrations 501 (FIGS. 6 and 7) relative to, for example a powder supporting surface 510 (e.g., FIG. 5) of the build plate 110 or the powder bed 1199 (FIG. 11). The in-plane vibrations 500 and/or the out-of-plane vibrations 501 may effect relative movement between the powder particles 1198 (FIG. 11) and cause compaction of the powder particles 1198 through, for example, local rearrangement of the powder particles 1198. From being exposed to the in-plane vibrations 500 and/or the out-of-plane vibrations 501, the local rearrangement of the powder particles 1198 may provide an increased packing density (compared to powder particles that have not been exposed to the in-plane vibrations 500 and/or the out-of-plane vibrations 501) and to expel possible air pockets that may be trapped within the powder bed 1199.

The powder dispensing unit 120, which may be employed with one or more of the powder spreading unit 130 and the vibratory compaction system 140, may provide a substantially continuous feed of powder particles 1198 to the build plate, rather than providing the powder particles in a localized area (e.g., a powder supply 299 area, FIG. 2A, adjacent the build plate 110) and pushing the powder particles across the build plate from the powder localized area. The powder dispensing unit 120 includes one or more powder reservoirs 121A-121n that are movable relative to the build plate 110, so as to translate along the powder supporting surface 510 (e.g., FIG. 5) of the build plate 110. In one aspect, the one or more powder reservoirs 121A-121n are arranged one behind the other relative to a travel direction (see, e.g., travel direction 281A in FIG. 12B) of the one or more powder reservoirs 121A-121n to provide for multiple layers of powder to be deposited by the powder dispensing unit 120 in a common or single pass/translation of the powder dispensing unit 120 along the powder supporting surface 510.

In one aspect, where multiple powder reservoirs 121A-121n are employed, the multiple powder reservoirs 121A-121n may store or hold powders having different characteristics (e.g., different physical characteristics and/or different chemical characteristics). For example, the powder held by the multiple powder reservoirs 121A-121n may have different sizes where coarse (e.g., larger) powder particles 1198C (FIGS. 12A and 12B) are deposited onto the build plate 110 or powder bed 1199 (FIG. 11) prior to fine (e.g., smaller compared to the coarse powder particles 1198C) powder particles 1198F, so that the fine powder particles 1198F may fill in or heal any pores, streaks and/or other defects in the powder bed 1199 that may cause porosity in the part being produced. Deposition of the fine powder particles 1198F on top of the coarse powder particles 1198C may result in an increased packing density compared to the deposition of only a powder having a single powder particle size. As another example, in addition to or in lieu of having powder particles 1198 of differing sizes, the multiple powder reservoirs 121A-121n may hold or store powders formed of different materials (e.g., different types of metals 190 in a common powder reservoir, a single type of metal 191 and polymer(s) 192 in a common powder reservoir, a single type of metal 191, polymer(s) 192, ceramics 193, polymer coated metals 194, polymer coated ceramics 195, etc., or a combination of any of the above in a common powder reservoir or in different powder reservoirs) to form in-situ composite parts during the additive manufacturing process, where layers of different materials are stacked one above the other relative to the powder supporting surface 510 (FIG. 5) of the build plate 110. In one aspect, the multiple powder reservoirs 121A-121n may be arranged side-by-side, in addition to or in lieu of being arranged one behind the other, so as to form in-situ composite parts where the layers of different material are arranged side-by-side relative to the powder supporting surface 510 (FIG. 5) of the build plate 110.

In another aspect, the one or more powder reservoirs include controllable/variably-sized powder dispensing apertures 1800 (FIGS. 18A and 18B), so that powder held by the respective powder reservoir 121A-121n may be deposited onto the powder supporting surface 510 at predetermined areas of the build plate 110 that correspond with a geometry of a part being produced. Deposition of the powder in the predetermined areas may provide for reduced cycle times and costs through a near net shape dispensation of the powder (e.g., the powder is dispensed in a manner that resembles the net shape of the part) to create the part rather than blanketing/covering the entire build plate 110 with powder irrespective of the geometry of the part being produced. For example, a width of the powder dispensing aperture 1800 may be adjustable both in size and position relative to a longitudinal centerline 1898 (FIG. 18B) of the build plate 110, so as to dispense the powder in the near net shape of the part (see e.g., part 1890 in FIGS. 18A and 18B and the near net shape powder deposition examples 1880, 1881 delineated by dashed line 1880L and dashed line 1881L). The size of the powder dispensing apertures 1800 may be controlled with any suitable controller 160 programmed to allow just enough powder to be deposited at predetermined positions of the build plate corresponding to the geometric requirements of the part geometry and other constraints relating to part build-up (e.g., such as unfused powder that is required to support superior layers of powder that are to be fused, such as when the part geometry requires holes or cavities within the part, etc.). Depositing powder in the near net shape may reduce an amount of powder used to form the part, reduce the time required to deposit the powder, reduce the amount of powder reclaimed and associated processing time of the reclaimed powder, and/or reduce cycle time and production costs. Thermal management pertaining to part formation may also be simplified as the excess powder surrounding the part is removed, thereby assisting in the heat transfer (e.g., there is less mass to absorb energy, so that the energy is directed for fusing the powder in a more efficient manner) from the energy source 177 (such as a laser, etc.) to the powder.

Referring to FIG. 1, as noted above, the additive manufacturing system 100 includes a build plate 110 and one or more of a powder spreading unit 130, a powder dispensing unit 120, and a vibratory compaction system 140. The build plate 110 is coupled to a frame 101 of the additive manufacturing system 100; while in other aspects the build plate 110 may be or form part of the frame 101. The powder spreading unit 130 and the powder dispensing unit 120 are movably coupled to the frame 101 so as to reciprocate above the build plate 110 for spreading and depositing powder on the build plate 110. The powder spreading unit 130 and the powder dispensing unit 120 are coupled to a reciprocating drive unit 150, so as to be driven in a travel direction 281 (FIG. 2A) across the build plate 110 for spreading the powder 298 (FIG. 2) onto the build plate 110. When the additive manufacturing system includes both the powder spreading unit 130 and powder dispensing unit 120, the reciprocating drive unit 150 may be configured to drive the powder spreading unit 130 and the powder dispensing unit 120 in travel direction 281 together as a single unit or individually (e.g., the powder spreading unit 130 and the powder dispensing unit 120 move independent of/relative to one another). In one aspect, the additive manufacturing system 100 includes a vibratory compaction system 140 coupled to one or more of the build plate 110, the powder dispensing unit 120, and the powder spreading unit 130.

Referring also to FIG. 2A, the powder 298 may be supplied to the powder spreading unit 130 by a powder supply 299 coupled to the build plate 110. The powder supply 299 includes at least one powder reservoir 297 which has for its base an elevator 290 that moves in direction 296 to lift the powder 298 from the reservoir 297 into a path of the powder spreading unit 130. The powder spreading unit 130 is configured to, under impetus of the reciprocating drive unit 150, push powder 298 from the at least one powder reservoir 297 onto the build plate 110. Any suitable controller 160 is provided to control the elevator 290 of the at least one powder reservoir 297 for lifting the powder 298 from the reservoir 297.

In another aspect, where additive manufacturing system 100 includes both the powder spreading unit 130 and the powder dispensing unit 120, in addition to or in lieu of the powder supply 299, the powder 298 may be supplied to the powder spreading unit 130 by the powder dispensing unit 120 (see, e.g., FIGS. 10, 11, 13, 15, and 16). In this example, powder 298 may be supplied to the powder dispensing unit 120 by a powder feed mechanism 170, which may be any suitable powder feed mechanism that feed/supplies powder 298 to at least one powder reservoir 121A-121n of the powder dispensing unit 120. Any suitable controller 160 is provided to control one or more of the reciprocating drive unit 150, the vibratory compaction system 140, and the dispensation of powder 298 from the powder dispensing unit 120.

Referring to FIGS. 1 and 2A, the powder spreading unit 130 includes a base member 200 and the plurality of recoater blades 131 that are configured to spread powder 298 onto the build plate 110. The plurality of recoater blades 131 each form a cantilevered resilient member 279 (FIG. 2A). One or more recoater blade 132A-132n (only four recoater blades 132A-132D are illustrated in FIG. 2A for exemplary purposes) of the plurality of recoater blades 131 includes a first end 133 coupled to the base member 200 and a second cantilevered end 134 extending away from the base member 200. In one aspect, one or more recoater blade 132A-132n of the plurality of recoater blades 131 is removably coupled to the base member 200 in any suitable manner (such as with clips, snaps, or other removable mechanical fasteners); while in other aspects, the one or more recoater blade 132A-132n of the plurality of recoater blades 131 may be formed as a singular unit with the base member 200. The plurality of recoater blades 131 are arranged one behind the other in a direction 280 extending along a travel direction 281 of the powder spreading unit 130.

Each recoater blade 132A-132n of the plurality of recoater blades 131 is spaced (see spacings 250, 251, 252 in FIG. 2A), with respect to a travel direction 281 of the powder spreading unit 130, from an adjacent recoater blade 132A-132n of the plurality of recoater blades 131. As an example, the spacing 250, 251, 252 may be between about 2 mm (about 0.08 inches) to about 6 mm (about 0.25 inches); however, in other aspects the spacing 250, 251, 252 may be any suitable spacing. In one aspect, the spacing 250, 251, 252 between a first pair of recoater blades of the plurality of recoater blades 131 is different than a spacing 250, 251, 252 between a second pair of recoater blades of the plurality of recoater blades 131. In one aspect the spacing 250, 251, 252 between a first pair of recoater blades of the plurality of recoater blades 131 is substantially the same as the spacing 250, 251, 252 between a second pair of recoater blades of the plurality of recoater blades 131. It is noted that the first pair of recoater blades includes such pairs as recoater blades 132A, 132B; or recoater blades 132B, 132C; or recoater blades 132C, 132D; or any other suitable pairing of adjacent recoater blades 132A-132n. The second pair of recoater blades includes such pairs as another of recoater blades 132A, 132B; or recoater blades 132B, 132C; or recoater blades 132C, 132D; or any other suitable pairing of adjacent recoater blades 132A-132n.

Referring to FIGS. 1, 2A, and 2B, in one aspect, each (or at least one) recoater blade 132A-132n of the plurality of recoater blades 131 has respective stiffness, where the respective stiffness depends on an ordinate position (e.g., relative to leading side 201) of a respective recoater blade 132A-132n in the line of recoater blades 132A-132n relative to the travel direction 281. In one aspect, the respective stiffness may be effected by a coupling 135A-135n between a respective recoater blade 132A-132n and the base member 200. For example, one or more recoater blade 132A-132n of the plurality of recoater blades 131 is coupled to the base member 200 by a coupling 135A-135n that has a first stiffness and another recoater blade 132A-132n of the plurality of recoater blades 131 is coupled to the base member 200 by another coupling 135A-135n having a second stiffness. In one aspect, the first stiffness is different than the second stiffness; while in other aspects, the first stiffness is substantially the same as the second stiffness. Coupling the recoater blades 132A-132n to the base member 200 with the respective coupling 135A-135n may provide a swinging or bending movement of the respective recoater blades 132A-132n, as shown in FIG. 2B (when the powder spreading unit is moved in the travel direction 281 to spread the powder 298), different where the second cantilevered end 134 trails (or lags behind—see FIG. 2B) the first end 133. In another aspect, the respective stiffness of a recoater blade 132A-132n may be effected by a material composition of the recoater blade 132A-132n. For example, one or more recoater blade 132A-132n may be constructed of a resilient material having a predetermined stiffness that allows the one or more recoater blade 132A-132n to flex so that the second cantilevered end 134 moves relative to the first end 133 where, when the powder spreading unit is moved in the travel direction 281 to spread the powder 298, the one or more recoater blade 132A-132n bends/flexes so that the second cantilevered end 134 moves so as to trail (or lag behind) the first end 133 in a manner substantially similar to that shown in FIG. 2B. The respective stiffness of the recoater blades 132A-132n decreases from a first recoater blade 132A of the plurality of recoater blades 131 in the line (e.g., a leading recoater blade relative to the travel direction 281A) to a last recoater blade 132n (shown in FIG. 2A as recoater blade 132D) of the plurality of recoater blades 131 in the line; while in other aspects, the recoater blades 132A-132n may be arranged to have any suitable stiffness relative to the position of the recoater blade 132A-132n in the plurality of recoater blades 131.

Referring to FIGS. 1, 2A, 2B, 3, and 4, as described above, the plurality of recoater blades 131 are arranged one behind the other (e.g., in a line) in the direction 280 extending along the travel direction 281A of the powder spreading unit 130. The plurality of recoater blades 131 may include any suitable types of recoater blades (e.g., serrated blades, doctor blades without serrations, finishing blades, etc.). A first recoater blade 132A-132n of the plurality of recoater blades 131 has a first shape (see e.g., the straight shape of recoater blades 132A-132C, the "bent" shape of recoater blade 132D, the serrated pattern/shape of recoater blade 132A, and the offset serrated pattern/shape of recoater blade 132B) and a second recoater blade 132A-132n of the plurality of recoater blades 131 has a second shape (again, see e.g., the straight shape of recoater blades 132A-132C in FIGS. 2A and 2B, the "bent" shape of recoater blade 132D in FIGS. 2A and 2B, the serrated pattern/shape of recoater blade 132A in FIGS. 3 and 4, and the offset serrated pattern/shape of recoater blade 132B in FIG. 4), wherein the first shape and the second shape are different from one another.

At least one of the plurality of recoater blades 131 includes serrations 300, 301 configured to move powder particles 1198 of the powder 298 (FIG. 2) in a direction 390 transverse (the direction may have more than one component such as a normal component 391, and a skewing component 392) to the travel direction 281 of the powder spreading unit 130. The normal component 391 of direction 390 may effect a compacting movement of the powder particles 1198. The skewing component 392 of direction 390 may effect, in addition to the compacting movement, driving the powder particles 1198 along/across the powder bed 1199 surface 1197, formed by previously deposited layers of powder 298, in direction 466 so that streaks, pores and/or voids in the powder bed 1199 surface 1197 may be filled in. For exemplary purposes, the powder spreading unit 130 is illustrated in FIGS. 2A and 2B as having at least one serrated blade 132A, 132B, at least one doctor blade 132C without serrations, and at least one finishing blade 132D. The at least one doctor blade 132C is disposed between the at least one serrated blade 132A, 132B and the at least one finishing blade 132D. The finishing blade 132D includes a first portion 241 and a second portion 242. The second portion 242 of the finishing blade 132D protrudes from the first portion 241 at an angle 275 and is configured to at least one of compact and smooth (e.g., where, as noted above, smoothing is bringing the portion of the particles forming a surface of the deposited powder into substantially the same plane) the powder 298.

Referring to FIGS. 2B, 3 and 4, a first recoater blade (e.g., serrated blade 132A) of the plurality of recoater blades 131 has a first serration pattern 300P on an end (e.g., second cantilevered end 134) nearest the powder 298 on the powder bed 1199/build plate 110. A second recoater blade (e.g., serrated blade 132B) of the plurality of recoater blades 131 has a second serration pattern 301P on an end (e.g., second cantilevered end 134) nearest the powder 298 on the powder bed 1199/build plate 110. The first serration pattern 300P and the second serration pattern 301P are different from one another as will be described below. In one aspect, the first serration pattern 300P and the second serration pattern 301P are offset relative to one another by a predetermined offset distance 400 (FIG. 4). The offset distance 400 is in one aspect, about half of an average of a spacing 410 between adjacent serrations 310 of the first serration pattern 300P plus a spacing 411 between adjacent serrations 310 of the second serration pattern 301P; while in other aspects the offset distance 400 may be any suitable distance. In one aspect, the spacing 410, 411 of the serration patterns 300P, 301P may be substantially the same; while in other aspects, the spacing 410 between adjacent serrations 310 of the first serration pattern 300P is different than another spacing 411 between adjacent serrations 310 of the second serration pattern 301P. In one aspect, the spacing 410, 411 may be between about five to about twenty-five times the size of a mean powder particle 1198 size (e.g., for illustrative purposes only, if the powder particles have a mean particle size of about 40 micron, then the one or more of a serration slot width 413 and a serration prong width 412 of recoater blade 132A would be between about 0.2 mm (about 0.008 inches) and about 1.0 mm (about 0.04 inches)), or any other suitable spacing. The spacing 410, 411 may include the serration slot width 413 and the serration prong width 412. In one aspect, the serration slot width 413 and the serration prong width 412 are substantially the same; while in other aspects the serration slot width 413 and the serration prong width 412 are different. In one aspect, the serration slot width 413 of one or more of the first serration pattern 300P and the second serration pattern 301P is between about one-tenth of a mean size of powder particles 1198 of the powder 298 (FIGS. 2A and 2B) and about a largest size (e.g., a largest particle size) of the powder particles 1198 of the powder 298.

At least one serration 310 of the first serration pattern 300P is arranged at a first angle 450 relative to the build plate 110 (e.g., such as from a reference plane 499 that extends orthogonally/normal from the powder supporting surface 510 of the build plate 110). At least one serration 310 of the second serration pattern 301P is arranged at a second angle 451 relative to the build plate 110 (e.g., such as from the reference plane 499). In one aspect, the first angle 450 is different than the second angle 451; while in other aspects the first angle 450 and the second angle 451 are substantially the same. As an example, the second angle 451 may be larger than the first angle 450 (e.g., the angle of the serration pattern of the trailing recoater blade, with respect to, e.g., the travel direction 281A, is greater than the angle of the serration pattern of the leading recoater blade) or vice versa. In one aspect, one or more of the first angle and the second angle is between about +10° to about −10° with respect to the reference plane 499 extending normal from the powder supporting surface 510 of the build plate; in another aspect, one or more of the first angle 450 and the second angle 451 is between about +30° to about −30° with respect to a reference plane 499; and in still another aspect, one or more of the first angle 450 and the second angle 451 is between about +45° to about −45° with respect to the reference plane 499.

As described above and shown in FIGS. 2B, 3 and 4, a first recoater blade 132A-132n of the plurality of recoater blades 131 is configured to contact the powder 298 in a first orientation and a second recoater blade 132A-132n of the plurality of recoater blades 131 is configured to contact the powder 298 in a second orientation. In one aspect, the first and second orientations include one or more of a deflection angle of the respective recoater blade resulting from the resiliency of the coupling 135A-135n or material stiffness of the cantilevered recoater blades 132A-132n (see FIGS. 2A and 2B), a "bent" shape (second portion 242) of the respective recoater blade (see finishing blade 132D), and a shape/offset of a serration pattern 300P, 301P (see FIGS. 3 and 4). In one aspect, the first orientation and the second orientation are different from one another; while in other aspects, the first orientation and the second orientation may be substantially the same.

Referring now to FIGS. 1, 5, 6, 7, 8, and 9, in one aspect, as described above, the additive manufacturing system 100 includes the vibratory compaction system 140. The vibratory compaction system 140 includes at least one vibration mechanism 141 coupled to one or more of the build plate 110, the at least one recoater blade 132A-132n of the plurality of recoater blades 131, and the powder dispensing unit 120. The at least one vibration mechanism 141 is coupled to the controller 160 where the controller 160 is configured to activate and deactivate the at least one vibration mechanism 141 to effect compaction of the powder 298 deposited on the powder supporting surface 510 (e.g., FIG. 5) of the build plate 110. The at least one vibration mechanism 141 includes one or more of a piezoelectric actuator 143, a transducer 142, or any other suitable vibration generating device that is capable of generating vibratory pulses as described herein.

As can be seen in FIGS. 5, 6, and 7, the additive manufacturing system includes the build plate 110 and the powder spreading unit 530, where the at least one vibration mechanism 141 is coupled to a recoater blade 132A of powder spreading unit 530. The powder spreading unit 530 is shown as having a single recoater blade 132A for exemplary purposes; while in other aspects the powder spreading unit 530 may be substantially similar to powder spreading unit 130 where the at least one recoater blade 132A-132n comprises a plurality of recoater blades 131 and where the at least one or more vibration mechanism 141 is disposed on one or more of the plurality of recoater blades 131 (e.g., the at least one vibration mechanism 141 is respectively coupled to one or more of the recoater blades 132A-132n). FIG. 6 illustrates the build plate 110 having the at least one vibration mechanism where the at least one vibration mechanism 141 is coupled to the build plate 110 in any suitable manner. For example, the at least one vibration mechanism 141 may be embedded within the powder supporting surface 510, be beneath powder supporting surface 510 or be at any other suitable location of the build plate 110. FIG. 7 illustrates both the build plate 110 and the powder spreading unit 530 having the at least one vibration mechanism 141. In one aspect, the at least one vibration mechanism 141 comprises at least a first vibration mechanism 141A coupled to the build plate 110 and a second vibration 141B mechanism, different than the first vibration mechanism 141A, coupled to the at least one recoater blade 132A (see FIG. 7).

Referring to FIGS. 7 and 8, the build plate 110 has a longitudinal axis 700 (see also longitudinal axis 1899 in FIG. 18A) and a lateral axis 800. The at least one recoater blade 132A extends at least partially along the lateral axis 800 and is configured to move relative to the build plate 110 along the longitudinal axis 700, such as in travel direction 281. In one aspect, where the at least one vibration mechanism 141 is disposed on the at least one recoater blade 132A, the at least one vibration mechanism 141 includes an array of vibration mechanisms 147, coupled to the at least one recoater blade 132A, extending at least in a direction of the lateral axis 800. In one aspect, the array of vibration mechanisms 147 may also extend in a direction normal to the powder supporting surface 510 of the build plate 110 as illustrated in FIG. 7. In one aspect, the array of vibration mechanisms 147 forms a two dimensional array/grid similar to that shown in FIG. 9 described below. Referring to FIGS. 7 and 9, where the build plate 110 includes the at least one vibration mechanism 141, the at least one vibration mechanism 141 includes an array of vibration mechanisms 147, coupled to the build plate 110 where the array of vibration mechanisms 147 extends along one or more of the longitudinal axis 700 and the lateral axis 800.

In one aspect, referring to FIG. 12A, where the additive manufacturing system 100 includes the powder dispensing unit 120 (FIG. 1), at least one powder reservoir 121A-121n (FIG. 1) of the powder dispensing unit 120 may include the at least one vibration mechanism 141. The at least one vibration mechanism 141 is coupled to the at least one powder reservoir 121A-12n in a manner substantially similar to that described herein with respect to the at least one recoater blade 132A (see FIG. 12A illustrating the at least one vibration mechanism 141 coupled to wall 1210 of powder reservoir 121B, where the wall 1210 forms a recoater blade 1211 substantially similar to any one of recoater blades 132A-132n; see also FIG. 10 where the at least one vibration mechanism 141 may be coupled to wall 1010).

Referring to FIGS. 5, 6 and 7, the controller 160 is coupled to the at least one vibration mechanism 141 and is configured to control activation of the at least one vibration mechanism 141 so that vibratory pulses 502 (see in-plane vibrations 500 and out-of-plane vibrations 501) are induced within the powder 298 to effect compaction of the powder 298 on the build plate 110. The controller 160 is configured to activate and deactivate the at least one vibration mechanism 141 in any suitable manner including, but not limited to, one or a combination of the following: in one aspect, the at least one vibration mechanism 141 is configured so as to be active while the powder 298 is being spread (see FIGS. 2B and 6, as the powder 298 is omitted from FIGS. 5 and 7 for clarity) by the at least one recoater blade 132A; in another aspect, the at least one vibration mechanism 141 is configured so as to be active prior to the powder 298 being spread by the at least one recoater blade 132A and/or after the powder 298 is spread by the at least one recoater blade 132A, so as to compact a powder that has already been spread across the powder supporting surface 510 of the build plate 110; in one aspect, the at least one vibration mechanism 141 includes at least a first vibration mechanism 141C and a second vibration mechanism 141D, where the first vibration mechanism 141C and the second vibration mechanism 141D are configured for substantially simultaneous activation (both of the first vibration mechanism 141C and the second vibration mechanism may be disposed on the at least one recoater blade 132A; both of the first vibration mechanism 141C and the second vibration mechanism may be disposed on the build plate 110; or one of the first vibration mechanism 141C and the second vibration mechanism may be disposed on the at least one recoater blade 132A and another of the first vibration mechanism 141C and the second vibration mechanism may be disposed on the build plate 110); in one aspect, the first vibration mechanism 141C and the second vibration mechanism 141D are configured for sequential activation; in another aspect, the first vibration mechanism 141C and the second vibration mechanism 141D are activated at different times. In one aspect, the first vibration mechanism 141C and the second vibration mechanism 141D are deactivated at different times.

The build plate 110 defines a powder build plane 510P (that is formed by the powder supporting surface 510) and the at least one vibration mechanism 141 is configured to generate, under control of the controller 160, one or more of in-plane vibrations 500 in the powder build plane 510P and out-of-plane vibrations 501 out of the powder build plane 510P (see FIGS. 5, 6, and 7). The one or more of the in-plane vibrations 500 and the out-of-plane vibrations 501 is transmitted to the powder 298 (see FIG. 6) through a respective one of the build plate 110 and the at least one recoater blade 132A. Generation of one or more of the in-plane vibrations 500 and the out-of-plane vibrations 501 may depend on which of the at least one vibration mechanism 141 is active. The at least one vibration mechanism 141 is configured, under the control of the controller 160, so as to generate the in-plane vibrations 500 and the out-of-plane vibrations 501 in an alternating sequence or at the same time.

Referring now to FIGS. 10 and 11, the powder dispensing unit 120, may be used with one or more of the vibratory compaction system 140 (see, e.g., FIGS. 1 and 10) and the powder spreading unit 130. See also FIGS. 12A, 13 and 15 for other various non-limiting exemplary combinations of the powder dispensing unit 120 with the vibratory compaction system 140 and the powder spreading unit 130; FIG. 12A for another non-limiting exemplary combination of the powder dispensing unit 120 with the vibratory compaction system 140; and FIG. 16 for another non-limiting exemplary combination of the powder dispensing unit 120 with the powder spreading unit 130. The powder dispensing unit includes a base member 1066 and a powder reservoir 121A coupled to the base member 1066. The base member 1066 may be integral to the powder reservoir 121A or the powder reservoir 121A may be coupled to the base member 1066 in any suitable manner. The powder reservoir 121A is configured to store a powder where one wall 1010 of the powder reservoir 121A forms a recoater blade 1011 substantially similar to any one of recoater blades 132A-132n. In the aspect illustrated in FIGS. 10 and 11, the powder spreading unit 130, 530 is coupled to the powder reservoir 121A of the powder dispensing unit 120 so that both the powder reservoir 121A and the powder spreading unit 130, 530 are moved as a singular unit by the reciprocating drive unit 150, e.g., under control of controller 160. As illustrated in FIG. 11, to dispense the powder 298, a powder dispensing closure 1050 of the powder reservoir 121A is opened under control of the controller 160 (or in any other suitable manner) so that the powder 298 falls onto and is deposited on the powder supporting surface 510 of the build plate 110. As the powder dispensing unit 120 moves in the travel direction 281A the powder 298 exits the reservoir underneath the wall 1010 and is smoothed using the recoater blade 1011 formed by the wall 1010 and using the powder spreading unit 130, 530. It is noted that the wall 1010 is spaced from the powder supporting surface 510 of the build plate 110 (or a previously deposited layer of powder) by distance 1099 to create a powder dispensing aperture 1064 for the powder 298 to exit the powder reservoir 121A.

In this aspect, the distance 1099 is larger than a distance 1098 between wall 1020 of the powder reservoir 121A and the build plate 110 (or powder bed 1199—FIG. 12B) (e.g., the distance 1098 substantially prevents passage of the powder 298 underneath the wall 1020 so that the powder reservoir deposits the powder 298 in a single travel direction 281A); in other aspects, the wall 1020 may also be spaced from the build plate by the distance 1099, so that the powder reservoir deposits the powder 298 bi-directionally (e.g., in both travel directions 281A and 281B—see FIGS. 14 and 17). Where the powder reservoir 121A (or a plurality of powder reservoirs disposed one behind the other—See FIGS. 14 and 17) bi-directionally deposit powder 298, powder spreading units 130, 530 may be disposed on both walls 1010, 1020 so that there is a powder spreading unit 130, 530 trailing the movement of the powder dispensing unit 120 in both travel directions 281A, 281B. Where the powder dispensing unit 120 is bi-directional, the powder reservoir(s) 121B, 121C (see powder reservoirs 121B, 121C in FIG. 14 and powder reservoir 121B in FIG. 17) disposed on the one side of the powder reservoir 121A are open (e.g., to dispense the respective powder 298A, 298B) while the powder reservoirs 121D, 121E (see powder reservoirs 121D, 121E in FIG. 14 and powder reservoir 121D in FIG. 17) on the other side of the powder reservoir 121A are closed, such as by a respective powder dispensing closure 1050 (so as not to dispense the respective powder 298A, 298B) and vice versa, depending on the travel direction 281A, 281B.

Referring to FIGS. 12A, 12B, 13, and 14, the powder dispensing unit 120 is shown illustrated above the build plate 110. In this aspect, the powder dispensing unit 120 includes the base member 1066 (FIGS. 1, 12A and 14) and at least two powder reservoirs 121A-121n coupled to the base member 1066 (e.g., the base member 1066 may be integral to at least one of the at least two powder reservoirs 121A-121n or the at least two powder reservoirs 121A-121n are coupled to the base member 1066 in any suitable manner). The at least two powder reservoirs 121A-121n include, for exemplary purposes, a first powder reservoir 121A and a second powder reservoir 121B; however, in other aspects more than two powder reservoirs may be provided. For example, a third powder reservoir 121C is shown in FIG. 14 coupled to the first powder reservoir 121A and the second powder reservoir 121B. The first powder reservoir 121A, as described above, is configured to store a first powder 298 and deposit the first powder 298 onto the build plate 110. The second powder reservoir 121B is configured to store a second powder 298A and deposit the second powder 298A onto the build plate 110. The third powder reservoir 121C (FIG. 14) is configured to store a third powder 298B (FIG. 14) and deposit the third powder 298B onto the build plate 110.

In FIGS. 12A and 12B both the first powder reservoir 121A and the second powder reservoir 121B are coupled to the reciprocating drive unit 150 and are configured to move relative to the build plate 110. In FIG. 14 the first powder reservoir 121A, the second powder reservoir 121B, and the third powder reservoir 121C are coupled to the reciprocating drive unit 150 and are configured to move relative to the build plate 110. Referring to FIG. 13, an example of powder reservoirs 121A, 121B that move relative to each other, or are separately driven by the reciprocating drive unit 150, are shown. In this aspect, the powder reservoirs 121A, 121B each have a powder spreading unit 130, 530 (each having one recoater blade or a plurality of recoater blades 131 with or without vibration mechanisms 141) coupled thereto in a manner similar to that described above with respect to FIGS. 10 and 11. In one aspect, the at least two reservoirs 121A-121n that are coupled so as to move as a single unit may also have one or more powder spreading units 130, 530 coupled thereto (see, e.g., FIGS. 15 and 16). In one aspect, the plurality of recoater blades 131 is positioned so as to trail behind the at least two powder reservoirs 121A-121n in the travel direction 281 of the at least two powder reservoirs 121A-121n relative to the build plate 110. In another aspect, at least one of the plurality of recoater blades 131 is integral with a wall 1010, 1210, 1410 of a respective powder reservoir 121A-121n. The at least one of the plurality of recoater blades integral with the wall 1010, 1210, 1410 (as shown in FIGS. 12A, 12B, and 14) and/or the disposition of the powder spreading unit between the powder reservoirs 121A, 121B (FIG. 13) so that at least one of the plurality of recoater blades 131 is disposed between the first powder reservoir 121A and the second powder reservoir 121B (and the third powder reservoir 121C) and another of the plurality of recoater blades 131 (which may be integral to the wall 1410 of the third powder reservoir 121C or part of a powder spreading unit 130) is positioned so as to trail behind the at least two powder reservoirs 121A-121n in a travel direction 281 of the at least two powder reservoirs 121A-121n relative to the build plate 110.

Referring to FIGS. 14 and 17, it is noted that where the at least two powder reservoirs 121A-121n are configured to deposit the respective powder 298, 298A, 298B bi-directionally along the travel direction 281 (as described above), powder reservoirs 121B, 121C may be disposed on one side of the powder reservoir 121A while powder reservoirs 121D, 121E may be disposed on the opposite side of the powder reservoir 121A (see FIG. 17 illustrating powder reservoirs 121B and 121D on opposite sides of powder reservoir 121A; and FIG. 14 where powder reservoirs 121D, 121E are shown in dashed lines). The powder reservoir 121D may be substantially similar to powder reservoir 121B and hold a substantially similar powder 298A to that held by powder reservoir 121B. The powder reservoir 121E may be substantially similar to powder reservoir 121C and hold a substantially similar powder 298B to that held by powder reservoir 121C.

As can be seen in FIGS. 12A, 12B, 13, 14, and 17, the first powder reservoir 121A leads the second powder reservoir 121B (and the third powder reservoir 121C) in travel direction 281A, and leads the powder reservoir 121D (and powder reservoir 121E) in the travel direction 281B. The first powder 298 is coarser than both the second powder 298A and the third powder 298B (and the second powder 298A is coarser than the third powder 298B). The second powder 298A is deposited on top of the first powder 298 by virtue of the powder reservoirs 121B, 121D trailing the powder reservoir 121A in respective travel directions 281A, 281B. The third powder 298B is deposited on top of the second powder 298A by virtue of the powder reservoirs 121C, 121E trailing the powder reservoirs 121B, 121D in respective travel directions 281A, 281B.

In one aspect, the at least two powder reservoirs 121A-121n are configured to move relative to the build plate 110 as a single unit (see FIGS. 12A, 12B, and 14); while in other aspects, one of the at least two powder reservoirs 121A-121n is configured, such as by the reciprocating drive unit 150, to move relative to the another of the at least two powder reservoirs 121A-121n (see, e.g., FIG. 13 illustrating the first powder reservoir 121A and the second powder reservoir 121B being individually coupled to the reciprocating drive unit for respective independent movement relative to each other and/or the build plate 110).

Each of the at least two powder reservoirs 121A-121n store a respective powder 298, 298A, 298B. In FIGS. 12A, 12B, 13, 15, and 16 only two powder reservoirs 121A, 121B and the respective first and second powders 298, 298A are illustrated for clarity; in FIG. 14 only three powder reservoirs 121A, 121B, 121C and the respective first, second, and third powders 298, 298A, 298B are illustrated for clarity; and in FIG. 17 only three powder reservoirs 121A, 121B, 121D and the respective first and second powders 298, 298A are illustrated for clarity. In one aspect, powder 298, 298A, 298B stored in one of the at least two powder reservoirs 121A-121n is the same as at least another powder 298, 298A, 298B stored in another of the at least two powder reservoirs 121A-121C. In another aspect, powder stored 298, 298A, 298B in one of the at least two powder reservoirs 121A-121n has a different predetermined characteristic from at least another powder 298, 298A, 298B stored in another of the at least two powder reservoirs 121A-121n. The at least one predetermined characteristic is one or more of a mean size of powder particles 1198, 1298 and a chemical composition of powder particles 1198, 1298. The chemical composition of a respective one of the first powder 298 and the second powder 298A is that of one or more of a polymer, a metal, a ceramic, a polymer coated ceramic, and a polymer coated metal. As non-limiting examples (which may be used alone or in combination), predetermined combinations of characteristics of the powders 298, 298A, 298B stored in the at least two powder reservoirs 121A-121n, include but are not limited to the following: one of the first powder 298 and the second powder 298A (and the third powder 298B) is a plastic and another of the first powder 298 and the second powder 298A (and the third powder 298B) is a metal; and one of the first powder 298 and the second powder 298A (and the third powder 298B) is a first type of metal and another of the first powder 298 and the second powder 298A (and the third powder 298B) is a different type of metal.

The at least two powder reservoirs 121A-121n of the additive manufacturing system 100 may effect the formation of in-situ alloy creation. For example, as described above, each respective powder 298, 298A, 298B may have a different chemical composition and the at least two powder reservoirs 121A-121n are arranged to deposit the respective powder 298, 298A, 298B so as to form an alloy or composite material 1274 (FIG. 12) in situ the additive manufacturing system 100. One non-limiting example of an alloy that may be produced in situ the additive manufacturing system 100 is an aluminum nickel alloy where the first powder reservoir 121 includes an aluminum powder and the second powder reservoir includes a nickel powder (other alloys or composites may be produced where the number of different materials in the alloy or composite are stored in respective ones of the at least two powder reservoirs 121A, 121n).

As illustrated in FIGS. 10-17, each respective powder 298, 298A, 298B has a different mean powder size (see, e.g., the different sizes of the powder particles 1198, 1298, 1498 in FIGS. 12A-17) and the at least two powder reservoirs 121A-121n are arranged to deposit the respective powder 298, 298A, 298B in an order from a coarsest powder to a finest powder. For example, the at least two powder reservoirs 121A-121n are arranged so that powder 298A, 298B, having a finer powder size, is deposited onto the powder 298, 298A having the coarser powder size (e.g., powder 298A is deposited onto powder 298 and powder 298B is deposited onto powder 298A). The first powder 298 has a coarser powder size than the second powder 298A (and the second powder 298A has a coarser powder size than the third powder 298B, etc.), where, at one or more predetermined locations on the build plate 110, the first powder 298 is deposited onto the build plate 110 prior to deposition of the second powder 298A (and, at one or more predetermined locations on the build plate 110, the second powder is deposited onto the build plate 110 prior to deposition of the third powder 298B).

As an exemplary arrangement of the at least two powder reservoirs 121A-121n, FIGS. 12A-17 illustrate the at least two powder reservoirs 121A-121n disposed one behind the other along the travel direction 281 of the at least two powder reservoirs 121A-121n. Disposing the at least two powder reservoirs 121A-121n one behind the other provides for a smoother powder bed 1199 surface 1197 (FIG. 11) by depositing powders 298A, 298B having the finer powder size onto powders 298, 298A having the coarser powder size. The at least two powder reservoirs 121A-121n store powders that have progressively smaller sizes (see, e.g., FIGS. 12A, 13, 14, and 17), where the powder particles 1198 of the first powder 298 are larger than the powder particles 1298 of the second powder 298A, the powder particles 1298 of the second powder 298A are larger than the powder particles 1498 of the third powder 298B, and so on so that deposition of finer powders (e.g., powders with smaller sized powder particles compared to other powders dispensed by the at least two powder reservoirs 121A-121n) trails deposition of coarser powders (e.g., powders with larger sized powder particles compared to other powders dispensed by the at least two powder reservoirs 121A-121n), so that the finer powders fill-in some of the pores and voids between the larger sized powder particles.

Referring to FIGS. 12A, 12B and 14-17, the first powder reservoir 121A and the second powder reservoir 121B (and the third powder reservoir 121C where provided) are configured to deposit the first powder 298 and the second powder 298A (and the third powder 298B) in a common movement relative to the build plate 110 along the travel direction 281 of the at least two powder reservoirs 121A-121n. For example, a distance 1099 between the first powder dispensing aperture 1064 of the first powder reservoir 121A and the build plate 110 is less than another distance 1299 between a second powder dispensing aperture 1264 of the second powder reservoir 121B and the build plate 110 (see FIGS. 12B and 14). Similarly, the distance 1299 between the second powder dispensing aperture 1264 of the second powder reservoir 121B and the build plate 110 is less than another distance 1499 between a third powder dispensing aperture 1464 of the third powder reservoir 121B and the build plate 110 (see FIG. 14). The progressively larger distances 1099, 1299, 1499 allow for deposition of progressively finer particles onto the powder bed 1199/build plate 110 in a common pass/movement of the powder dispensing unit 120 along the build plate 110. Similarly, where the at least two powder reservoirs 121A-121n are configured to move relative to/separately from one another (as shown in FIG. 13), the distance 1099 between the first powder dispensing aperture 1064 of the first powder reservoir 121A and the build plate 110 is less than another distance 1299 between a second powder dispensing aperture 1264 of the second powder reservoir 121B and the build plate 110, so as to allow for deposition of progressively finer particles onto the powder bed 1199/build plate 110.

Referring now to FIGS. 18A and 18B, an exemplary powder reservoir 121 of the powder dispensing unit 120 is illustrated (the powder reservoir 121 is illustrated in FIG. 18A without end side walls for clarity). The powder reservoir 121 may be substantially similar to the powder reservoirs 121A-121n described above. The powder reservoir 121 is illustrated above the build plate 110, where the build plate 110 includes a longitudinal axis 1899 along which the powder reservoir 121 moves relative to the build plate 110. In this aspect, the powder reservoir 121 includes a powder dispensing aperture 1800 having a variable size. For example, the powder dispensing aperture 1800 has a width 1801 that extends transverse to the longitudinal axis 1899. The width 1801 of the powder dispensing aperture 1800 is variable, so as to extend (e.g., become larger) or contract (e.g., become smaller) with respect, for example, to a width 1802 of the powder reservoir 121. The position of the powder dispensing aperture 1800 may also be adjustable in direction 1810 relative to a longitudinal centerline 1898 of the build plate 110 (or a centerline 1803 of the powder reservoir 121, where in some aspects, the centerline 1803 and the longitudinal centerline 1898 may be coincident with each other).

Still referring to FIGS. 18A and 18B, the controller 160 is coupled to the powder reservoir 121 and is configured to effect a variable sizing of the powder dispensing aperture 1800. The variable sizing of the powder dispensing aperture 1800 may be effected by the controller 160 as the powder reservoir 121 moves relative to the build plate 110. The controller 160 is configured to variably size the powder dispensing aperture 1800, such as relative to the longitudinal centerline 1898, based on the structure (part) 1890 produced by the additive manufacturing system 100 so as to deposit the powder 298 in the near net shape. The controller 160 is configured to variably size the width 1801, so that the powder dispensing aperture 1800 is offset (see FIG. 18B) relative to the longitudinal centerline 1898 of the build plate 110.

The powder dispensing aperture 1800 having the variable size effects deposition of powder 298 on less than an entirety of the build plate 110. In one aspect, a structure 1890 produced by the additive manufacturing system 100 is smaller than the build plate 110 and more than 50% of the powder 298 deposited on the build plate 110 is used to produce the structure 1890. In another aspect, structure 1890 produced by the additive manufacturing system 100 is smaller than the build plate 110 and more than 75% of the powder 298 deposited on the build plate 110 is used to produce the structure 1890. In still another aspect, structure 1890 produced by the additive manufacturing system 100 is smaller than the build plate 110 and more than 90% of the powder 298 deposited on the build plate 110 is used to produce the structure 1890. For example, FIG. 18A illustrates the structure 1890 disposed on the build plate 110. FIG. 18B illustrates exemplary near net shape powder deposition patterns 1880, 1881 that may be deposited by the powder reservoir 121 to manufacture the structure 1890. The powder deposition pattern 1880 is denoted by dashed line 1880L and conforms to a rectangle defined by a length and width of the structure 1890. The powder deposition pattern 1881 is denoted by the dashed line 1881L and conforms to the detailed contours of the structure 1890. The near net shape powder deposition provided by the powder reservoir 121 preserves the powder 298 for the production of the structure 1890 rather than spreading the powder on portions of the build plate 110 that are not used to support the structure 1890.

Referring also to FIG. 23, an example of powder deposition savings (e.g., in both the amount of powder used and cycle time) using the powder reservoir 121 will be described when compared to a typical powder spreading using only a recoater blade that spreads powder over substantially the entirety of the build plate. In this example, the dimensions provided are exemplary only. The build plate 110 has a width 2301 of about 25 cm (about 10 inches) and a length 2302 of about 25 cm (about 10 inches). The structure 1890 being produced is, for example, a frustum of a pyramid having a base with a width 1891 of about 10 cm (about 4 inches) and a length 1892 of about 10 cm (about 4 inches). The structure 1890 has a top having a width 1894 of about 5 cm (about 2 inches) and a length 1895 of about 5 cm (about 2 inches). The structure has a height 1893 of about 8 cm (about 3.25 inches). An amount of powder typically required for spreading on the build plate 110, such as with a recoater blade alone would be about 5000 cm$^3$ (about 305 in$^3$) where the powder is spread substantially over the entirety of the powder supporting surface 510 of the build plate 110. An amount of powder required for depositing on the build plate using the powder reservoir 121 having the variable width 1801 powder dispensing aperture 1800 would be about 480 cm$^3$ (about 29 in$^3$) which is about a 90% powder savings compared to spreading the powder over the entirety of the powder supporting surface 510 of the build plate 110. The savings in powder deposition reduces the cycle time (e.g., powder reclamation time) of producing the structure 1890. The savings in powder deposition also preserves the powder for use in manufacturing the structure 1890, so that larger parts may be produced without having to replenish the powder supply, and/or provides for smaller powder reservoirs to be employed.

Referring to FIGS. 19, 20A, 20B, and 20C the powder dispensing aperture 1800 of the powder reservoir 121 may be at least partially closed by the powder dispensing closure 1050. The powder dispensing closure 1050 includes at least one shutter 1900 adjacent the powder dispensing aperture 1800. At least one stepper motor 1910, 1911 is coupled to the at least one shutter 1900 of the powder dispensing aperture 1800 to effect variable sizing of the powder dispensing aperture 1800 and to define the variable size of the powder dispensing aperture 1800. As described above, the powder dispensing closure 1050, and the at least one shutter 1900, is disposed, adjacent the build plate 110, at a bottom of the powder reservoir 121 so as to stop passage of powder 298 passing through the powder dispensing aperture 1800.

Referring to FIG. 19, in one aspect, the at least one shutter 1900 includes at least one plate 1901, 1902. For example, the build plate 110 includes the longitudinal axis 1899 along which the powder reservoir 121 moves relative to the build plate 110 (the powder reservoir 121 is illustrated in FIG. 19 without the end side walls for clarity). The powder reservoir 121 has the width 1802 that extends transverse to the longitudinal axis 1899. The powder reservoir 121 comprises opposing shutters 1900A, 1900B, where at least one stepper motor 1910, 1911 is coupled to the opposing shutters 1900A, 1900B so as to, at least, variably size the powder dispensing aperture 1800 along the width 1802. The at least one stepper motor 1910, 1911 may also be coupled to the opposing shutters 1900A, 1900B so as to variably position the powder dispensing aperture 1800 along the width 1802 so that the powder dispensing aperture is offset from the centerline 1803. For example, opposing shutter 1900A includes plate 1901 that is coupled to the stepper motor 1911. The plate 1901 is movably coupled to the bottom of the powder reservoir 121 so as to move in direction 1999 transverse to the centerline 1803. Opposing shutter 1900B includes plate 1902 that is coupled to the stepper motor 1910. The plate 1902 is movably coupled to the bottom of the powder reservoir 121 so as to move in direction 1999 transverse to the centerline 1803. The stepper motors 1910, 1911 are coupled to the controller 160 so as to, under control of the controller 160, move the respective plate 1901, 1902 in direction 1999 where the plates are one or more of moved together in unison in the same direction (e.g., to offset the powder dispensing aperture 1800 from the centerline 1803) and moved in opposite directions at the same time or different times (e.g., to increase or decrease the width 1801 of the powder dispensing aperture 1800).

Referring to FIGS. 20A, 20B, and 20D, in one aspect, the at least one shutter 1900 includes at least one spiral spring 1903, 1904. The at least one spiral spring 1903, 1904 includes a first spiral spring 1903 and a second spiral spring 1904 configured to wind and unwind in opposing directions. Each of the first spiral spring 1903 and the second spiral spring 1904 has respective apertures 2070 (see, e.g., FIG. 20D) that, at least in part, define the powder dispensing aperture 1800. For example, the build plate 110 includes the longitudinal axis 1899 along which the powder reservoir 121 moves relative to the build plate 110 (the powder reservoir 121 is illustrated in FIG. 20A without the end side walls for clarity). The powder reservoir 121 has the width 1802 that extends transverse to the longitudinal axis 1899. The powder reservoir 121 comprises opposing shutters 1900A, 1900B, where at least one stepper motor 1910, 1911 is coupled to the opposing shutters 1900A, 1900B so as to, at least, variably size the powder dispensing aperture 1800 along the width 1802. The at least one stepper motor 1910, 1911 may also be coupled to the opposing shutters 1900A, 1900B so as to variably position the powder dispensing aperture 1800 along the width 1802 so that the powder dispensing aperture is offset from the centerline 1803. For example, opposing shutter 1900A includes spiral spring 1903 that is coupled to the stepper motor 1911. The spiral spring 1903 includes a first end 1905 and a second end 1906. The second end 1906 defines a first and second tong 2000, 2001 so as to form a slot 2003 having a root 2002 extending between the first and second tong 2000, 2001. The root 2002 defines a movable end of the powder dispensing aperture 1800.

The spiral spring 1903 is coiled to at least one shaft 2010, 2011 mounted to the at least one powder reservoir 121. At least one stepper motor 1910, 1911 is coupled to the spiral spring 1903 to effect variable sizing of the powder dispensing aperture 1800. For example, the first end 1905 of the spiral spring 1903 may be wound around a shaft 2010 (FIG. 20B) so that as the spiral spring 1903 is pulled from the shaft 2010 the spiral spring 1903 is biased to recoil around the shaft 2010 in direction 2099. The second end 1906 of the spiral spring 1903 is wound around shaft 2011. The shaft 2011 may be driven by the stepper motor 1911 so as to pull or uncoil the spiral spring 1903 from the shaft 2010 (or to allow recoiling of the spiral spring 1903 on the shaft 2010) so as to move the root 2002 in direction 1999. The spiral spring 1903 is movably coupled to the bottom of the powder reservoir 121 so that the root 2002 moves in direction 1999 transverse to the centerline 1803. Opposing shutter 1900B includes spiral spring 1904 that is coupled to the stepper motor 1910. The spiral spring 1904 is substantially similar to spiral spring 1903 and is movably coupled to the bottom of the powder reservoir 121 so that the root 2002 of spiral spring 1903 moves in direction 1999 transverse to the centerline 1803 under the impetus of the stepper motor 1910. The stepper motors 1910, 1911 are coupled to the controller 160 so as to, under control of the controller 160, move the respective roots 2002 of the spiral springs 1903, 1904 in direction 1999 where the roots 2002 are one or more of moved together in unison in the same direction (e.g., to offset the powder dispensing aperture 1800 from the centerline 1803) and moved in opposite directions at the same time or different times (e.g., to increase or decrease the width 1801 of the powder dispensing aperture 1800).

Referring to FIGS. 20A, 20C and 20D, in one aspect, the at least one shutter 1900 includes at least one flexible sheet 2020, 2021. For example, the build plate 110 includes the longitudinal axis 1899 along which the powder reservoir 121 moves relative to the build plate 110 (the powder reservoir 121 is illustrated in FIG. 20A without the end side walls for clarity). The powder reservoir 121 has the width 1802 that extends transverse to the longitudinal axis 1899. The powder reservoir 121 comprises opposing shutters 1900A, 1900B, where at least one stepper motor 1910, 1911 is coupled to the opposing shutters 1900A, 1900B so as to, at least, variably size the powder dispensing aperture 1800 along the width 1802. The at least one stepper motor 1910, 1911 may also be coupled to the opposing shutters 1900A, 1900B so as to variably position the powder dispensing aperture 1800 along the width 1802 so that the powder dispensing aperture is offset from the centerline 1803. For example, opposing shutter 1900A includes flexible sheet 2020 that is coupled to the stepper motor 1910. The flexible sheet 2020 includes a first end 1905 and a second end 1906. The second end 1906 defines a first and second tong 2000, 2001 so as to form a slot 2003 having a root 2002 extending between the first and second tong 2000, 2001 so as to form an aperture 270 that at least in part defines the powder dispensing aperture 1800. The root 2002 defines a movable end of the powder dispensing aperture 1800. The flexible sheet 2020 is movably coupled to the bottom of the powder reservoir 121 so that the first end 1905 and the second end 1906 of the flexible sheet 2020 bend so as to travel along lateral ends 12151, 12152 of the powder reservoir 121. The flexible sheet 2020 may be driven by the stepper motor 1910 so as to move the root 2002 in direction 1999. Opposing shutter 1900B includes flexible sheet 2021 that is coupled to the stepper motor 1911. The flexible sheet 2021 is substantially similar to flexible sheet 2020 and is movably coupled to the bottom of the powder reservoir 121 so that the root 2002 of flexible sheet 2021 moves in direction 1999 transverse to the centerline 1803 under the impetus of the stepper motor 1911. The stepper motors 1910, 1911 are coupled to the controller 160 so as to, under control of the controller 160, move the respective roots 2002 of the flexible sheets 2020, 2021 in direction 1999 where the roots 2002 are one or more of moved together in unison in the same direction (e.g., to offset the powder dispensing aperture 1800 from the centerline 1803) and moved in opposite directions at the same time or different times (e.g., to increase or decrease the width 1801 of the powder dispensing aperture 1800).

Referring to FIG. 21, in a manner similar to that described above, the additive manufacturing system 100 may include at least two powder reservoirs 121A-121n (only powder reservoirs 121A, 121B are shown for illustrative purposes) having the variably sized powder dispensing aperture 1800. In the manner described above, in one aspect, each of the at least two powder reservoirs 121A, 121B may be coupled to the reciprocating drive unit 150 so as to be separately moved, in travel direction 281, relative another of the at least two powder reservoirs 121A, 121B. In the manner described above, in another aspect, the at least two powder reservoirs 121A, 121B may be coupled to the reciprocating drive unit 150 so as to move in travel direction 281 as a single unit.

Referring to FIG. 22, at least one of the powder reservoirs 121 of the additive manufacturing system 100 may be configured to deposit one or more powders 298, 298A in a side by side arrangement on the powder supporting surface 510 of the build plate 110. For example, the build plate 110 includes a longitudinal axis 1899 along which the at least one powder reservoir 121 moves relative to the build plate 110. The at least one powder reservoir 121 has a width 1802 that extends transverse to the longitudinal axis 1899. The at least one powder reservoir 121 includes a plurality of powder storage compartments 2201, 2202 arranged side by side along the width 1802 so as to dispense powder 298, 298A from the respective powder storage compartments 2201, 2202 onto the build plate 110 in a side by side arrangement transverse to the longitudinal axis 1899. As described above, deposition of the powders 298, 298A provides for the in situ formation of alloys or composites.

The powder reservoir of FIG. 22 may include a diaphragm 2210 extending between adjacent powder storage compartments 2201, 2202. The diaphragm 2210 is coupled to the powder dispensing aperture 1800 (e.g., such as to the plates 1901, 1902, the spiral springs 1903, 1904, or flexible sheets 2020, 2021) so that a portion of the powder dispensing aperture 1800 dispenses the first powder 298 from a first powder storage compartment 2202 of the plurality of powder storage compartments 2201, 2202 and another portion of the powder dispensing aperture 1800 dispenses the second powder 298A from a second powder storage compartment 2201 of the plurality of powder storage compartments 2201, 2202. In one aspect, the powder dispensing aperture 1800 is formed, at least in part, by at least one shutter 1900A, 1900B that is variably positioned along the width 1802 of the powder reservoir 121. The diaphragm 2210 is coupled to the at least one shutter 1900A, 1900B so that one end 2211 of the diaphragm moves with the at least one shutter 1900A, 1900B along the width 1802. In one aspect, the powder dispensing aperture may have a fixed width 1801 where the diaphragm 2210 is coupled to both opposing shutters 1900A, 1900B. In another aspect, the diaphragm may be coupled to a diaphragm positioning member 2250 (shown in dashed lines) that is substantially similar to one of the plates 1901, 1902, the spiral springs 1903, 1904, or flexible sheets 2020, 2021 so that an end 2211 of the diaphragm 2210 adjacent the powder dispensing aperture 1800 is moves (e.g., by stepper motor(s) coupled to and under control of the controller 160) relative to the opposing shutters 1900A, 1900B so that the width 1801 of the powder dispensing aperture 1800 may be variable as described herein.

Referring now to FIGS. 24, 25, 26, and 27 exemplary methods 2400, 2500, 2600, 2700 for spreading and/or dispensing powder(s) 298, 298A, 298B on the build plate 110 in the additive manufacturing system 100 will be described. The exemplary methods may be employed individually or in any suitable combination thereof.

Referring to FIGS. 1-4 and 24, the method 2400 includes depositing powder 298, 298A, 298B on the build plate 110 (FIG. 24, Block 2410). In one aspect depositing powder 298, 298A, 298B on the build plate 110 includes pushing the powder 298, 298A, 298B from the at least one powder reservoir 297 with the powder spreading unit 130. In another aspect, depositing the powder 298, 298A, 298B on the build plate 110 with at least one powder reservoir 121A-121n of the powder spreading unit 130 (in this aspect, the powder dispensing unit 120 is coupled to the powder spreading unit 130—see, e.g., FIGS. 10, 11, 13, 15, and 16), where the powder reservoir 121A-121n reciprocates in the travel direction 281 across the build plate 110, and where the powder 298, 298A, 298B deposited by the at least one powder reservoir 121A-121n is spread with the plurality of recoater blades 131 coupled to the at least one powder reservoir. In one aspect, depositing the powder 298, 298A, 298B includes depositing, with at least one of a plurality of powder reservoirs 121A-121n, powder particles 1198, 1298, 1498 (see FIGS. 11, 12, and 14) having a different size than powder particles 1198, 1298, 1498 deposited by another powder reservoir of the plurality of powder reservoirs 121A-121n. In one aspect, depositing the powder 298, 298A, 298B includes varying a size of a powder dispensing aperture 1800 (FIG. 18) of at least one powder reservoir 121A-121n.

The method 2400 also includes spreading the powder 298, 298A, 298B on the build plate 110 (FIG. 24, Block 2420) with a powder spreading unit 130 having a plurality of recoater blades 131. For example, powder spreading unit 130 is driven in a travel direction 281 across the build plate 110, with a reciprocating drive unit 150, so as to spread the powder onto the build plate 110. In one aspect, spreading the powder 298, 298A, 298B includes contacting the powder 298, 298A, 298B with a first recoater blade (e.g., one of recoater blades 132A-132D) of the plurality of recoater blades 131 in a first orientation, and contacting the powder with a second recoater blade (e.g., another of recoater blades 132A-132D) of the plurality of recoater blades 131 in a second orientation, wherein the first orientation and the second orientation are different from one another as described above. Spreading the powder 298, 298A, 298B may also include compacting and smoothing the powder 298, 298A, 298B with at least one finishing blade 132D of the plurality of recoater blades 131, wherein the plurality of recoater blades 131 are arranged one behind the other in a direction extending along the travel direction 281 of the powder spreading unit 130, and the plurality of recoater blades 131 includes at least one serrated blade 132A, 132B, at least one doctor blade 132C, and the at least one finishing blade 132D. In one aspect, spreading the powder 298, 298A, 298B on the build plate 110 includes moving powder particles 1198, 1298, 1498 (see FIGS. 11, 12, and 14) of the powder 298, 298A, 298B in a direction transverse to the travel direction 281 of the powder spreading unit 130 with serrations 310 of at least one of the plurality of recoater blades 131. Spreading the powder 298, 298A, 298B may also include compacting the powder 298, 298A, 298B spread on the build plate 110 with at least one vibration mechanism 141 disposed on at least one recoater blade 132A-132n of the plurality of recoater blades 131 and/or compacting the powder 298, 298A, 298B spread on the build plate 110 with at least one vibration mechanism 141 disposed on the build plate 110.

Referring to FIGS. 1, 10-17, 21, and 25, the method 2500 includes storing powder 298, 298A, 298B in at least two powder reservoirs 121A-121n (FIG. 25, Block 2510), where a first powder reservoir 121A stores a first powder 298 and moves relative to the build plate 110, and a second powder reservoir 121B stores a second powder 298A and moves relative to the build plate 110. In one aspect, the first powder 298 has at least one predetermined characteristic that is different than that of the second powder 298A. In one aspect, powder 298, 298A, 298B stored in one of the at least two powder reservoirs 121A-121n is the same as at least another powder 298, 298A, 298B stored in another of the at least two powder reservoirs 121A-121n. In one aspect, each of the at least two powder reservoirs 121A-121n stores a respective powder 298, 298A, 298B, where each respective powder 298, 298A, 298B is different than another respective powder 298, 298A, 298B stored in another of the at least two powder reservoirs 121A-121n, and each respective powder 298, 298A, 298B has a different mean powder particle size. In one aspect, storing powder 298, 298A, 298B includes storing the powders 298, 298A, 298B that have progressively smaller sizes in the at least two powder reservoirs 121A-121n where the at least two powder reservoirs 121A-121n are disposed one behind the other along the travel direction 281 of the at least two powder reservoirs 121A-121n.

The method 2500 also includes depositing, from a respective one of the first powder reservoir 121A and the second powder reservoir 121B, the first powder 298 and the second powder 298A onto the build plate 110 (FIG. 25, Block 2520). In the method 2500 the first powder 298 is deposited at one or more predetermined locations on the build plate 110 prior to deposition of the second powder 298A, 298B where the first powder 298 has a coarser powder particle size than the second powder 298A, 298B. In one aspect, depositing the first and second powder 298, 298A includes moving the at least two powder reservoirs 121A-121n relative to the build plate 110 as a single unit. In one aspect, depositing the first and second powder 298, 298A includes moving one of the first powder reservoir 121A and the second powder reservoir 121B relative to the other of the first powder reservoir 121A and the second powder reservoir 121B. In one aspect, depositing the powder includes depositing finer powder particles 1198F on top of coarser powder particles 1198C so that deposition of the finer powder particles 1198F trails deposition of the coarser powder particles 1198C. In one aspect, a respective powder 298, 298A, 298B is deposited from the at least two powder reservoirs 121A-121n in an order from a coarsest powder to a finest powder. In one aspect, the respective powder 298, 298A, 298B is bi-directionally deposited from the at least two powder reservoirs 121A-121n along the travel direction 281 of the at least two powder reservoirs 121A-121n. In one aspect, the second powder 298A and the third powder 298B are deposited on top of the first powder 298 (as described above), where the first powder 298 is coarser than the second powder 298A and the third powder 298B. In one aspect, depositing the powder 298, 298A, 298B includes compacting the first powder 298 and the second powder 298A deposited on the build plate 110 with at least one vibration mechanism 141 coupled to one or more of the at least two powder reservoirs 121A-121n and the build plate 110. In one aspect, a size of a powder dispensing aperture 1800 (FIG. 18) of one or more of the at least two powder reservoirs 121A-121n is varied during dispensing of a respective powder 298, 298A, 298B. In one aspect, depositing the powder includes one or more of smoothing and compacting a the first powder 298 and the second powder 298A deposited on the build plate 110 with a plurality of recoater blades 132A-132n coupled to one or more of the at least two powder reservoirs 121A-121n.

The method 2500 may also include forming, in situ the additive manufacturing system 100, an alloy or composite material (FIG. 25, Block 2530) wherein each respective powder 298, 298A, 298B of the at least two powder reservoirs 121A-121n has a different chemical composition. The method 2500 may also include supplying powder 298, 298A, 298B with a powder feed mechanism 170 to a respective powder reservoir 121A-121n (FIG. 25, Block 2540).

Referring to FIGS. 1, 18A-22, and 26, the method 2600 includes storing powder 298, 298A, 298B in at least one powder reservoir 121A-121n (FIG. 26, Block 2610). The method 2600 also includes varying a size of the powder dispensing aperture 1800 of the at least one powder reservoir 121A-121n when depositing powder 298, 298A, 298B onto the build plate 110 (FIG. 26, Block 2620). The width 1801 of the powder dispensing aperture 1800 is varied with the controller 160 coupled to the at least one powder reservoir. In one aspect, the width 1801 of the powder dispensing aperture 1800 is varied with the controller 160 so that the powder dispensing aperture 1800 is offset relative to the longitudinal centerline 1898 of the build plate 110. In one aspect, the width 1801 of the powder dispensing aperture 1800 is varied with the controller 160 relative to the longitudinal centerline 1898 of the build plate 110 based on a structure 1890 produced by the additive manufacturing system 100. The width 1801 is varied as the at least one powder reservoir 121A-121n moves relative to the build plate 110. Varying the size of the powder dispensing aperture 1800 includes depositing powder 298, 298A, 298B on less than an entirety of the build plate 110. The size of the powder dispensing aperture 1800 may be varied with at least one stepper motor 1910, 1911 that drives at least one shutter 1900A, 1900B.

Referring to FIGS. 1, 5-9, and 27, the method 2700 includes controlling, with the controller 160, actuation of at least one vibration mechanism 141 coupled to one or more of the build plate 110 and at least one recoater blade 132A-132n (FIG. 27, Block 2710). The method 2700 also includes inducing vibratory pulses 502 within the powder 298, 298A, 298B with the at least one vibration mechanism 141 to effect compaction of the powder 298, 298A, 298B on the build plate 110 (FIG. 27, Block 2720). In one aspect, the at least one vibration mechanism 141 is activated while the powder 298, 298A, 298B is being spread by at least one recoater blade 132A-132n. In one aspect, the at least one vibration mechanism 141 is activated prior to the powder 298, 298A, 298B being spread by the at least one recoater blade 132A-132n and/or after the powder 298, 298A, 298B is spread by the at least one recoater blade 132A-132n. In one aspect, the at least one vibration mechanism 141 includes at least a first vibration mechanism 141A-141D and a second vibration mechanism 141A-141D, and the first vibration mechanism 141A-141D and the second vibration mechanism 141A-141D are substantially simultaneously activated with the controller 160. In one aspect, the first vibration mechanism 141A-141D and the second vibration mechanism 141A-141D are sequentially activated with the controller 160. In one aspect, the first vibration mechanism 141A-141D and the second vibration mechanism 141A-141D are activated at different times with the controller 160. In one aspect, the first vibration mechanism 141A-141D and the second vibration mechanism 141A-141D are deactivated at different times with the controller 160. In one aspect, the build plate 110 defines a powder build plane 510P and the at least one vibration mechanism 141 is activated by the controller 160 to generate one or more of in-plane vibrations 500 in the powder build plane 510P and out-of-plane vibrations 501 out of the powder build plane 510P. The one or more of the in-plane vibrations 500 and the out-of-plane vibrations 501 are transmitted to the powder 298, 298A, 298B through a respective one of the build plate 110 and the at least one recoater blade 132A-132n. Generation of one or more of the in-plane vibrations 500 and the out-of-plane vibrations 501 depends on which of the at least one vibration mechanism 141 is active. In one aspect, the controller 160 activates the at least one vibration mechanism 141 so as to generate the in-plane vibrations 500 and the out-of-plane vibrations 501 in an alternating sequence. In one aspect the at least one vibration mechanism 141 is moved along the longitudinal axis 1899 with the at least one recoater blade 132A-132n. The where the at least one vibration mechanism 141 is the vibratory pulses 502 generated by the at least one vibration mechanism 141 follow movement of the at least one recoater blade 132A-132n along the longitudinal axis 1899.

The following are provided in accordance with the aspects of the present disclosure:

A1. An additive manufacturing system comprising:
a build plate;
at least one recoater blade configured to spread powder onto the build plate; and
at least one vibration mechanism coupled to one or more of the build plate and the at least one recoater blade.

A2. The system of paragraph A1, wherein the at least one vibration mechanism includes a piezoelectric actuator.

A3. The system of paragraph A1 (or A2), wherein the at least one vibration mechanism comprises a first vibration mechanism coupled to the build plate and a second vibration mechanism, different than the first vibration mechanism, coupled to the at least one recoater blade.

A4. The system of paragraph A1 (or any of the preceding paragraphs), wherein the at least one vibration mechanism includes a transducer.

A5. The system of paragraph A1 (or any of the preceding paragraphs), wherein the at least one vibration mechanism is configured so as to be active while the powder is being spread by the at least one recoater blade.

A6. The system of paragraph A1 (or any of the preceding paragraphs), wherein the at least one vibration mechanism is configured so as to be one or more of active prior to the powder being spread by the at least one recoater blade and after the powder is spread by the at least one recoater blade.

A7. The system of paragraph A1 (or any of the preceding paragraphs), further comprising a controller coupled to the at least one vibration mechanism, the controller being configured to activate and deactivate the at least one vibration mechanism.

A8. The system of paragraph A1 (or any of the preceding paragraphs), wherein the at least one vibration mechanism includes at least a first vibration mechanism and a second vibration mechanism, where the first vibration mechanism and the second vibration mechanism are configured for substantially simultaneous activation.

A9. The system of paragraph A1 (or any of the preceding paragraphs), wherein the at least one vibration mechanism includes at least a first vibration mechanism and a second vibration mechanism, where the first vibration mechanism and the second vibration mechanism are configured for sequential activation.

A10. The system of paragraph A1 (or any of the preceding paragraphs), wherein the at least one vibration mechanism includes at least a first vibration mechanism and a second vibration mechanism, where the first vibration mechanism and the second vibration mechanism are activated at different times.

A11. The system of paragraph A1 (or any of the preceding paragraphs), wherein the at least one vibration mechanism includes at least a first vibration mechanism and a second vibration mechanism, where the first vibration mechanism and the second vibration mechanism are deactivated at different times.

A12. The system of paragraph A1 (or any of the preceding paragraphs), wherein the build plate defines a powder build plane and the at least one vibration mechanism is configured to generate one or more of in-plane vibrations in the powder build plane and out-of-plane vibrations out of the powder build plane A13. The system of paragraph A12, where the one or more of the in-plane vibrations and the out-of-plane vibrations is transmitted to the powder through a respective one of the build plate and the at least one recoater blade.

A14. The system of paragraph A12, wherein generation of one or more of the in-plane vibrations and the out-of-plane vibrations depends on which of the at least one vibration mechanism is active.

A15. The system of paragraph A12, wherein the at least one vibration mechanism is configured so as to generate the in-plane vibrations and the out-of-plane vibrations in an alternating sequence.

A16. The system of paragraph A1 (or any of the preceding paragraphs), wherein:
the build plate has a longitudinal axis and a lateral axis;

the at least one recoater blade extends at least partially along the lateral axis and is configured to move relative to the build plate along the longitudinal axis; and the at least one vibration mechanism includes an array of vibration mechanisms, coupled to the at least one recoater blade, extending at least in a direction of the lateral axis.

A17. The system of paragraph A1 (or any of the preceding paragraphs), wherein:

the build plate has a longitudinal axis and a lateral axis; and the at least one vibration mechanism includes an array of vibration mechanisms, coupled to the build plate, extending along one or more of the longitudinal axis and the lateral axis.

A18. The system of paragraph A1 (or any of the preceding paragraphs), wherein the at least one recoater blade comprises a plurality of recoater blades where the at least one or more vibration mechanism is disposed on one or more of the plurality of recoater blades.

A19. The system of paragraph A1 (or any of the preceding paragraphs), further comprising:

at least one powder reservoir configured for reciprocating movement in a travel direction across the build plate so as to deposit the powder on the build plate; and the at least one recoater blade is coupled to the at least one powder reservoir so as to spread the powder deposited by the at least one powder reservoir.

A20. The system of paragraph A19, wherein the at least one powder reservoir includes a plurality of powder reservoirs, and at least one of the plurality of powder reservoirs is configured to deposit powder particles having a different size than powder particles deposited by another powder reservoir of the at least one powder reservoir.

A21. The system of paragraph A19, wherein the at least one powder reservoir comprises a powder dispensing aperture having a variable size.

A22. The system of paragraph A1 (or any of the preceding paragraphs), further comprising a reciprocating drive unit, the at least one recoater blade being coupled to the drive unit so as to be driven in a travel direction across the build plate and spread the powder onto the build plate.

A23. The system of paragraph A22, further comprising at least one powder reservoir, the powder spreading unit being configured to, under impetus of the reciprocating drive unit, push powder from the at least one powder reservoir onto the build plate.

B1. A vibratory compaction system for an additive manufacturing system having a build plate and at least one recoater blade configured to spread powder onto the build plate, the vibratory compaction system comprising:

at least one vibration mechanism coupled to one or more of the build plate and the at least one recoater blade; and a controller coupled to the at least one vibration mechanism, the controller being configured to control actuation of the at least one vibration mechanism so that vibratory pulses are induced within the powder to effect compaction of the powder on the build plate.

B2. The system of paragraph B, wherein the at least one vibration mechanism includes a piezoelectric actuator.

B3. The system of paragraph B1 (or B2), wherein the at least one vibration mechanism comprises a first vibration mechanism coupled to the build plate and a second vibration mechanism, different than the first vibration mechanism, coupled to the at least one recoater blade.

B4. The system of paragraph B1 (or any of the preceding paragraphs), wherein the at least one vibration mechanism includes a transducer.

B5. The system of paragraph B1 (or any of the preceding paragraphs), wherein the controller is configured to activate the at least one vibration mechanism while the powder is being spread by the at least one recoater blade.

B6. The system of paragraph B1 (or any of the preceding paragraphs), wherein the controller is configured to activate the at least one vibration mechanism prior to the powder being spread by the at least one recoater blade and after the powder is spread by the at least one recoater blade.

B7. The system of paragraph B1 (or any of the preceding paragraphs), wherein the at least one vibration mechanism includes at least a first vibration mechanism and a second vibration mechanism, and the controller is configured to substantially simultaneously activate the first vibration mechanism and the second vibration mechanism.

B8. The system of paragraph B1 (or any of the preceding paragraphs), wherein the at least one vibration mechanism includes at least a first vibration mechanism and a second vibration mechanism, and the controller is configured to sequentially activate the first vibration mechanism and the second vibration mechanism.

B9. The system of paragraph B1 (or any of the preceding paragraphs), wherein the at least one vibration mechanism includes at least a first vibration mechanism and a second vibration mechanism, and the controller is configured to activate the first vibration mechanism and the second vibration mechanism at different times.

B10. The system of paragraph B1 (or any of the preceding paragraphs), wherein the at least one vibration mechanism includes at least a first vibration mechanism and a second vibration mechanism, and the controller is configured to deactivate the first vibration mechanism and the second vibration mechanism at different times.

B11. The system of paragraph B1 (or any of the preceding paragraphs), wherein the build plate defines a powder build plane and the controller is configured to activate the at least one vibration mechanism to generate one or more of in-plane vibrations in the powder build plane and out-of-plane vibrations out of the powder build plane B12. The system of paragraph B11, where the one or more of the in-plane vibrations and the out-of-plane vibrations is transmitted to the powder through a respective one of the build plate and the at least one recoater blade.

B13. The system of paragraph B11, wherein generation of one or more of the in-plane vibrations and the out-of-plane vibrations depends on which of the at least one vibration mechanism is active.

B14. The system of paragraph B11, wherein the controller is configured to activate the at least one vibration mechanism is configured so as to generate the in-plane vibrations and the out-of-plane vibrations in an alternating sequence.

B15. The system of paragraph B1 (or any of the preceding paragraphs), wherein:

the build plate has a longitudinal axis and a lateral axis;

the at least one recoater blade extends at least partially along the lateral axis and is configured to move relative to the build plate along the longitudinal axis; and the at least one vibration mechanism includes an array of vibration mechanisms, coupled to the at least one recoater blade, extending at least in a direction of the lateral axis.

B16. The system of paragraph B1 (or any of the preceding paragraphs), wherein:

the build plate has a longitudinal axis and a lateral axis; and the at least one vibration mechanism includes an array of vibration mechanisms, coupled to the build plate, extending along one or more of the longitudinal axis and the lateral axis.

C1. A method for compacting powder on a build plate of an additive manufacturing system where the additive manufacturing system has the build plate and at least one recoater blade configured to spread powder onto the build plate, the method comprising:

controlling, with a controller, actuation of at least one vibration mechanism so that vibratory pulses are induced within the powder to effect compaction of the powder on the build plate; and wherein the at least one vibration mechanism is coupled to one or more of the build plate and the at least one recoater blade.

C2. The method of paragraph C1, further comprising activating, with the controller, the at least one vibration mechanism while the powder is being spread by the at least one recoater blade.

C3. The method of paragraph C1 (or C2), further comprising activating, with the controller, the at least one vibration mechanism prior to the powder being spread by the at least one recoater blade and after the powder is spread by the at least one recoater blade.

C4. The method of paragraph C1 (or any of the preceding paragraphs), further comprising activating, with the controller, the at least one vibration mechanism prior to the powder being spread by the at least one recoater blade.

C5. The method of paragraph C1 (or any of the preceding paragraphs), further comprising activating, with the controller, the at least one vibration mechanism after the powder is spread by the at least one recoater blade.

C6. The method of paragraph C1 (or any of the preceding paragraphs), wherein the at least one vibration mechanism includes at least a first vibration mechanism and a second vibration mechanism, the method further comprising substantially simultaneously activating, with the controller, the first vibration mechanism and the second vibration mechanism.

C7. The method of paragraph C1 (or any of the preceding paragraphs), wherein the at least one vibration mechanism includes at least a first vibration mechanism and a second vibration mechanism, the method further comprising sequentially activating, with the controller, the first vibration mechanism and the second vibration mechanism.

C8. The method of paragraph C1 (or any of the preceding paragraphs), wherein the at least one vibration mechanism includes at least a first vibration mechanism and a second vibration mechanism, the method further comprising activating, with the controller, the first vibration mechanism and the second vibration mechanism at different times.

C9. The method of paragraph C1 (or any of the preceding paragraphs), wherein the at least one vibration mechanism includes at least a first vibration mechanism and a second vibration mechanism, the method further comprising de-activating, with the controller, the first vibration mechanism and the second vibration mechanism at different times.

C10. The method of paragraph C1 (or any of the preceding paragraphs), wherein the build plate defines a powder build plane, the method further comprising activating, with the controller, the at least one vibration mechanism to generate one or more of in-plane vibrations in the powder build plane and out-of-plane vibrations out of the powder build plane C11. The method of paragraph C10, where the one or more of the in-plane vibrations and the out-of-plane vibrations is transmitted to the powder through a respective one of the build plate and the at least one recoater blade.

C12. The method of paragraph C10, wherein generation of one or more of the in-plane vibrations and the out-of-plane vibrations depends on which of the at least one vibration mechanism is active.

C13. The method of paragraph C10, further comprising activating, with the controller, the at least one vibration mechanism so as to generate the in-plane vibrations and the out-of-plane vibrations in an alternating sequence.

C14. The method of paragraph C1 (or any of the preceding paragraphs), wherein the build plate has a longitudinal axis and a lateral axis and the at least one recoater blade extends at least partially along the lateral axis and is configured to move relative to the build plate along the longitudinal axis, the method further comprising:

moving the at least one vibration mechanism along the longitudinal axis with the at least one recoater blade.

C15. The method of paragraph C1 (or any of the preceding paragraphs), wherein the build plate has a longitudinal axis and a lateral axis and the at least one recoater blade extends at least partially along the lateral axis and is configured to move relative to the build plate along the longitudinal axis, the method further comprising:

activating, with the controller, the at least one vibration mechanism so that vibratory pulses generated by the at least one vibration mechanism follow movement of the at least one recoater blade along the longitudinal axis.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 24-27, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 24-27 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An additive manufacturing system comprising:
   a build plate;
   at least one recoater blade configured to spread powder onto the build plate; and
   at least one vibration mechanism, wherein at least the build plate includes the at least one vibration mechanism.

2. The system of claim 1, wherein the at least one vibration mechanism includes a piezoelectric actuator.

3. The system of claim 1, wherein the at least one vibration mechanism comprises a first vibration mechanism coupled to the build plate and a second vibration mechanism, different than the first vibration mechanism, coupled to the at least one recoater blade.

4. The system of claim 1, wherein the at least one vibration mechanism includes a transducer.

5. The system of claim 1, further comprising a controller coupled to the at least one vibration mechanism, the controller being configured to activate and deactivate the at least one vibration mechanism.

6. The system of claim 3, wherein the build plate defines a powder build plane and the at least one vibration mechanism is configured to generate one or more of in-plane vibrations in the powder build plane and out-of-plane vibrations out of the powder build plane.

7. The system of claim 6, where the one or more of the in-plane vibrations and the out-of-plane vibrations is transmitted to the powder through a respective one of the build plate and the at least one recoater blade.

8. The system of claim 1, wherein:
   the build plate has a longitudinal axis and a lateral axis;
   the at least one recoater blade extends at least partially along the lateral axis and is configured to move relative to the build plate along the longitudinal axis; and
   the at least one vibration mechanism includes an array of vibration mechanisms, coupled to the at least one recoater blade, extending at least in a direction of the lateral axis.

9. The system of claim 1, wherein:
   the build plate has a longitudinal axis and a lateral axis; and
   the at least one vibration mechanism includes an array of vibration mechanisms, coupled to the build plate, extending along one or more of the longitudinal axis and the lateral axis.

10. A vibratory compaction system for an additive manufacturing system having a build plate and at least one recoater blade configured to spread powder onto the build plate, the vibratory compaction system comprising:
- at least one vibration mechanism, wherein at least the build plate includes the at least one vibration mechanism; and
- a controller coupled to the at least one vibration mechanism, the controller being configured to control actuation of the at least one vibration mechanism so that vibratory pulses are induced within the powder to effect compaction of the powder on the build plate.

11. The system of claim 10, wherein the controller is configured to activate the at least one vibration mechanism while the powder is being spread by the at least one recoater blade.

12. The system of claim 10, wherein the controller is configured to activate the at least one vibration mechanism prior to the powder being spread by the at least one recoater blade and after the powder is spread by the at least one recoater blade.

13. The system of claim 10, wherein the at least one vibration mechanism includes at least a first vibration mechanism and a second vibration mechanism, and the controller is configured to substantially simultaneously activate the first vibration mechanism and the second vibration mechanism.

14. The system of claim 10, wherein the at least one vibration mechanism includes at least a first vibration mechanism and a second vibration mechanism, and the controller is configured to sequentially activate the first vibration mechanism and the second vibration mechanism.

15. The system of claim 10, wherein the build plate defines a powder build plane and the controller is configured to activate the at least one vibration mechanism to generate one or more of in-plane vibrations in the powder build plane and out-of-plane vibrations out of the powder build plane.

16. The system of claim 15, wherein the controller is configured to activate the at least one vibration mechanism is configured so as to generate the in-plane vibrations and the out-of-plane vibrations in an alternating sequence.

17. A method for compacting powder on a build plate of an additive manufacturing system where the additive manufacturing system has the build plate and at least one recoater blade configured to spread powder onto the build plate, the method comprising:
- controlling, with a controller, actuation of at least one vibration mechanism so that vibratory pulses are induced within the powder to effect compaction of the powder on the build plate; and
- wherein at least the build plate includes the at least one vibration mechanism.

18. The method of claim 17, further comprising activating, with the controller, the at least one vibration mechanism while the powder is being spread by the at least one recoater blade.

19. The method of claim 17, further comprising activating, with the controller, the at least one vibration mechanism after the powder is spread by the at least one recoater blade.

20. The method of claim 17, wherein the build plate defines a powder build plane, the method further comprising activating, with the controller, the at least one vibration mechanism to generate one or more of in-plane vibrations in the powder build plane and out-of-plane vibrations out of the powder build plane.

* * * * *